US012234969B2

(12) United States Patent
Hierzer

(10) Patent No.: US 12,234,969 B2
(45) Date of Patent: Feb. 25, 2025

(54) MOUNTING ARRANGEMENT FOR MOUNTING A LIGHT ASSEMBLY AND LIGHTING APPARATUS HAVING AT LEAST ONE SUCH MOUNTING ARRANGEMENT

(71) Applicant: H4X e.U., Graz (AT)

(72) Inventor: Andreas Hierzer, Graz (AT)

(73) Assignee: H4X E.U., Graz (AT)

( * ) Notice: Subject to any disclaimer, the term of this patent is extended or adjusted under 35 U.S.C. 154(b) by 0 days.

(21) Appl. No.: 18/643,361

(22) Filed: Apr. 23, 2024

(65) Prior Publication Data

US 2024/0353085 A1 Oct. 24, 2024

(30) Foreign Application Priority Data

Apr. 24, 2023 (DE) ......................... 102023110440.3

(51) Int. Cl.
*F21V 17/18* (2006.01)
*F21V 17/16* (2006.01)
(Continued)

(52) U.S. Cl.
CPC ............ *F21V 17/18* (2013.01); *F21V 17/162* (2013.01); *F21V 21/025* (2013.01); *F21V 21/03* (2013.01); *F21Y 2115/15* (2016.08)

(58) Field of Classification Search
CPC ........ F21V 21/03; F21V 21/05; F21V 17/162; F21V 17/18; F21Y 2115/15
See application file for complete search history.

(56) References Cited

U.S. PATENT DOCUMENTS 3,205,863 A 9/1965 Rhoades
7,607,795 B2 10/2009 Engel
(Continued)

FOREIGN PATENT DOCUMENTS

DE 3244516 * 12/1982 ............ F21V 17/104
DE 102004048484 A1 4/2006
(Continued)

OTHER PUBLICATIONS

Office Action in corresponding DE application 10 2023 110 440.3 dated Jan. 16, 2024 (1 page).
(Continued)

*Primary Examiner* — Zheng Song
(74) *Attorney, Agent, or Firm* — Millen, White, Zelano & Branigan P.C.; William F. Nixon

(57) ABSTRACT

A mounting arrangement mounts a light assembly in an elongated rail profile that opens on a longitudinal side. The mounting arrangement has a latching device to engage the rail profile to hold the light assembly. The mounting assembly has a blocking arrangement to a release configuration in which the engagement of the latching device into the rail profile can be effected and released by overcoming an elastic force effect of the latching device, and can be moved to a blocking configuration in which the blocking arrangement prevents the engagement from being released against the elastic force effect. The blocking arrangement includes an actuating element which can be actuated in a state in which the mounting arrangement holds the light assembly, which is inserted into the rail profile. The blocking arrangement can be moved to the release configuration and the blocking configuration in each case by means of the actuating element.

22 Claims, 14 Drawing Sheets

(51) Int. Cl.

| | |
|---|---|
| ***F21V 21/02*** | (2006.01) |
| *F21V 21/03* | (2006.01) |
| *F21Y 115/15* | (2016.01) |

(56) References Cited

U.S. PATENT DOCUMENTS

| | | | | |
|---|---|---|---|---|
| 11,236,858 | B1 | 2/2022 | Rigby | |
| 2001/0045347 | A1* | 11/2001 | Gerald | H01R 25/165 200/51.05 |
| 2005/0002182 | A1 | 1/2005 | Kotovsky et al. | |
| 2009/0280673 | A1* | 11/2009 | Kohen | F21V 23/06 439/529 |
| 2017/0198888 | A1* | 7/2017 | Seifert | F21S 9/02 |

FOREIGN PATENT DOCUMENTS

| | | | | | |
|---|---|---|---|---|---|
| DE | 102009004025 | A1 | | 7/2010 | |
| DE | 102011051038 | A1 | * | 12/2012 | F21K 9/56 |
| DE | 202012100629 | | * | 5/2013 | F21V 21/025 |
| DE | 102012107303 | | * | 11/2013 | F21V 17/20 |
| DE | 202013103419 | U1 | | 11/2014 | |
| DE | 102013020510 | B3 | | 4/2015 | |
| DE | 102015109998 | A1 | * | 12/2016 | F21S 4/28 |
| DE | 102019126943 | A1 | * | 4/2021 | F21S 4/20 |
| EP | 0813027 | A2 | | 12/1997 | |
| WO | WO-2016096650 | A1 | * | 6/2016 | F21V 17/02 |
| WO | WO-2021069296 | A1 | * | 4/2021 | F21S 4/20 |

OTHER PUBLICATIONS

Office Action in corresponding EP application 24172028 dated Oct. 21, 2024 (3 pages).

* cited by examiner

MOUNTING ARRANGEMENT FOR MOUNTING A LIGHT ASSEMBLY AND LIGHTING APPARATUS HAVING AT LEAST ONE SUCH MOUNTING ARRANGEMENT

FIELD OF THE INVENTION

The invention relates to the field of lighting apparatuses, e.g. for lighting purposes in buildings. In this case, the invention relates in particular to the field of profile lights and/or profile or rail light systems. The invention relates to a mounting arrangement for mounting a light assembly in an elongated rail profile which is open on a longitudinal side, and relates to a lighting apparatus having a rail profile, a light assembly and such a mounting arrangement.

TECHNICAL BACKGROUND

Profile lights and profile light systems have already been proposed. In the case of conventional profile lights or profile light systems, provision is frequently made e.g. that light insets are supplied permanently installed with a profile to a construction site where the assembly is to be effected. Such light insets are usually wired to a converter or operating unit which is installed in this profile or is located outside the profile. If the light insets are to be subsequently introduced into the profile on the construction site, the wiring procedure is also cumbersome in conventional construction methods.

Rail light systems having light insets which can be inserted into a rail are also already known.

SUMMARY OF THE INVENTION

Against this background, it is an object of the invention to make the assembly and disassembly of light insets or light assemblies in profiles, e.g. in order to produce a profile light or a lighting apparatus based on a profile or rail light system, more simple and more flexible.

In accordance with the invention, this object is achieved by a mounting arrangement comprising the features of claim 1 and/or by a lighting apparatus comprising the features of claim 19.

Accordingly, a mounting arrangement is proposed for mounting a light assembly in an elongated rail profile which is open on a longitudinal side.

In this case, the mounting arrangement has a latching device which is adapted to engage in a latching manner into the rail profile in order to hold the light assembly.

Furthermore, the mounting arrangement has a blocking arrangement which can be moved to a release configuration and to a blocking configuration. In the release configuration, the engagement of the latching device into the rail profile can be effected and released by overcoming an elastic force effect of the latching device. In the blocking configuration, the blocking arrangement prevents the engagement from being released against the elastic force effect. In particular, the blocking arrangement in the blocking configuration can also prevent the engagement of the latching device from being effected.

In this case, the blocking arrangement comprises an actuating element which can be actuated by an operator in a state in which the mounting arrangement holds the light assembly, which is inserted into the rail profile, therein, wherein the blocking arrangement can be moved to the release configuration and the blocking configuration in each case by means of actuation of the actuating element by pressing.

Also proposed is a lighting apparatus comprising an elongated rail profile, which is open on a longitudinal side, a light assembly and at least one mounting arrangement in accordance with the invention. In this case, the light assembly is inserted into the rail profile and the latching device of the mounting arrangement engages in a latching manner into the rail profile in order to hold the light assembly.

One concept forming the basis of the invention resides in the fact that, in this manner, the light assembly in the manner of an inset can be inserted by the fitter quickly, easily and flexibly, in particular at any selectable point along an already installed rail profile. In particular, in a first assembly step, the light assembly can be introduced into the rail profile easily and in an uncomplicated manner and can even be mounted thereon by means of latching engagement of the latching device, without the operator or fitter having to perform any further hand movements in this first step. Therefore, assembly is greatly simplified, specifically e.g. in the case of relatively long light assemblies, especially since the light assembly already automatically holds itself in place after insertion. Final fixing is then effected by simple pressing onto the actuating element. Particularly when working in the ceiling region or above head height, it is very convenient to simply press in one or a plurality of actuating elements, which can be effected in a problem-free manner one after the other if there is a plurality of mounting arrangements on a light assembly. In a similar manner, the blocking arrangement can then be released easily and in a problem-free manner as required in order to remove the light assembly from the rail profile.

Advantageous embodiments and developments of the invention are apparent from the dependent claims and from the description with reference to the figures in the drawing.

In one embodiment, the actuating element, for actuation thereof by the operator, can be displaced along a direction, which is substantially in parallel with a depth direction of the rail profile, by exerting a pressure force onto the actuating element. Therefore, the actuation is possible in a simple and intuitive manner.

In particular, the actuating element can be actuated by the operator without the use of tools. Therefore, the actuation is possible in a particularly simple and comfortable manner.

In particular, during actuation, the actuating element can be displaced against an elastic force. In this manner, e.g. undesired actuation can be counteracted and the actuating element can always assume a defined position when not actuated.

In one development, the blocking arrangement can be transferred in an alternating manner to the release configuration and the blocking configuration by actuating the actuating element multiple times. This makes it easy and manageable for the operator or fitter to switch between release and blocking.

According to one embodiment, the mounting arrangement has a body. In this case, the latching device has latching elements which are arranged on the body and are adapted to engage in a latching manner in each case behind an edge extending along the rail profile or an undercut of the rail profile extending along the rail profile. In this manner, the light assembly can be held reliably on the rail profile, wherein, in particular, flexible positioning of the light assembly along the rail profile is also made possible.

In one embodiment, the latching elements can be pivoted preferably in an elastic manner in each case about a pivot axis which extends substantially in parallel with a longitudinal direction of the rail profile. This simplifies the production of the mounting arrangement still further.

In one embodiment, the latching elements are provided on opposite sides of the body, wherein by means of the latching elements on opposite sides of the rail profile, it is possible to engage behind edges or undercuts provided in the rail profile. In this case, in the blocking configuration of the blocking arrangement each of the latching elements is prevented in each case from being released from the edge or the undercut. In this manner, reliable mounting is achieved and moreover any undesired release of the latching elements can be reliably prevented. In particular, at least two latching elements can be provided in this case on the opposite sides of the body.

In one embodiment, the latching elements are each connected to the body in one piece in an elastically movable manner. This contributes to simple producibility of the mounting arrangement.

According to one development, the blocking arrangement has a displaceably guided blocking element. In this case, the blocking element in the release configuration is located in a first displacement position, in which the latching elements for effecting or releasing the engagement into the rail profile can each be moved against the elastic force effect. Furthermore, in this development the blocking element in the blocking configuration is located in a second displacement position, in which the blocking element prevents the movement of the latching elements for effecting or releasing the engagement into the rail profile in each case against the elastic force effect or limits a path of the movement of the latching elements. Therefore, a simple structure and at the same time a reliable blocking effect on the latching elements can be achieved.

In one embodiment, a protrusion is connected in each case to the latching elements and is provided on an inner side of the latching element facing an inner region of the body. In this case, the protrusions provided on the inner side of the latching elements face one another. In this case, the blocking element can be displaced such that the blocking element in the blocking configuration is arranged substantially between the protrusions. Therefore, by displacing the blocking element, e.g. two latching elements can be blocked together to prevent undesired movement against the clastic force effect or the movement of the latching elements can be sufficiently restricted in such a manner as to prevent the engagement into the rail profile from being effected or released. This can also help to further simplify the structure of the mounting arrangement and at the same time to achieve reliable mounting of the light assembly. Furthermore, this embodiment can contribute in providing effective protection of the blocking arrangement against external influence and to the mechanically stable configuration and blocking effect thereof.

In one development, the actuating element and the blocking element are arranged so as to be displaceable along a common displacement axis. In this case, the blocking arrangement also has a sleeve which can be displaced along the displacement axis by actuation of the actuating element and can be rotated incrementally about the displacement axis, wherein the sleeve is arranged in the direction of the displacement axis in sections between surfaces of the actuating element and the blocking element which are provided for contact with the sleeve. In this development, the sleeve is supported in the release configuration in a first position along the displacement axis relative to the body and is supported in the blocking configuration in a second position, different from the first position, along the displacement axis relative to the body. Therefore, with the aid of these two support and inoperative positions of the sleeve, two displacement positions of the blocking element can be implemented for the release configuration and blocking configuration respectively. As in the case of a ballpoint pen, in this development the use of the incrementally rotatable sleeve enables the two inoperative positions to be reached alternately by pressing the actuating element multiple times in the same direction.

In particular, in one embodiment the actuating element has a coupling portion which extends through an opening in the blocking element and engages in sections behind the blocking element. In this manner, a form-fitting connection can be established for transmitting a force in one direction between blocking element and actuating element.

In particular, the coupling portion can extend through a hollow interior of the sleeve.

According to one embodiment, the actuating element has an end-face actuating surface and a circumferential surface portion adjacent to the actuating surface. In this case, the circumferential surface portion is concealed in the blocking configuration. In particular, the circumferential surface portion can be designed as a signal surface and/or having a warning colour. In this manner, the displacement position of the actuating element in the release configuration and blocking configuration can be advantageously used to inform the fitter or operator about whether the latching device can be released from the rail profile by overcoming the elastic force or whether the engagement can be effected during insertion, in other words whether the latching device is blocked or not. In an advantageous manner, this makes it even easier to prevent the actuation from being forgotten during assembly.

In one development, the mounting arrangement has a guide portion for the actuating element. In this case, the rail profile, in which the light assembly can be mounted by means of the mounting arrangement, can be closed, at least in regions, on the open longitudinal side by means of an insertable cover such that the cover conceals the guide portion on the visible side. Furthermore, provision is made in this development that the actuating element in the release configuration protrudes from the guide portion and/or the actuating element in the blocking configuration is substantially flush with a side of the guide portion facing the cover. Therefore, e.g. good actuation capability, an aesthetic appearance of the lighting apparatus and at the same time an effective warning function of the actuating element can be achieved by means of this protruding action. In particular, this prevents the cover from being attached before the blocking arrangement is moved to the blocking configuration and the light assembly is thus secured to prevent unintentional release.

According to another embodiment, provision is made that the actuating element in the release configuration protrudes on the outer side from a visible side of a housing or a reflector or a reflector arrangement of the light assembly and/or that the actuating element in the blocking configuration is substantially flush with a visible-side housing surface or a visible-side surface of a reflector component of the light assembly. In this way, a good signalling effect can again be achieved for the fitter or operator and they can be informed that the actuating element is to be actuated for final fixing of the light assembly. Again, the flush alignment in the blocking configuration permits a clean, aesthetic appearance of a lighting apparatus after final fixing of the light assembly.

According to one development, the mounting arrangement for the mechanical coupling to the light assembly is configured so as to be able to be latched thereto. Therefore, the mechanical coupling to the light assembly can be achieved in a simple, time-saving and reliable manner.

In particular, the mounting arrangement can be mechanically coupled, in particular latched, to a housing component or a profile-shaped carrier component and/or reflector component or a printed circuit board of the light assembly provided with LED devices. This can contribute to a simple structure of a lighting apparatus.

For example, provision can be made that the mounting arrangement is adapted to engage in a latching manner behind opposite longitudinal edges of the housing component or carrier component or reflector component or behind opposite longitudinal edges of the printed circuit board.

In one embodiment, the body of the mounting arrangement has a U-shaped cross-section at least in sections, wherein a portion of the light assembly can be received in an inner region of the U-shape. This advantageously allows stable and reliable reception of the light assembly and coupling thereto. Furthermore, the light assembly, during insertion into the rail profile, can thus be protected and guided by the shape of the body, and the orientation of the light assembly in the rail profile can be stabilised with the aid of the U-shape of the body.

According to one development, a housing or a reflector or a reflector arrangement of the light assembly is provided on a visible side with an opening, wherein the actuating element in the release configuration protrudes on the outer side through the opening. Therefore, the actuating element is easily accessible for actuation thereof.

In one embodiment of the lighting apparatus, the rail profile can be closed at least in regions, or is closed at least in regions, on the open longitudinal side by means of an insertable cover, wherein the inserted cover covers the actuating element. Therefore, an aesthetically appealing lighting apparatus can be achieved. The cover can also help to influence the light emission in the desired way, protect the light assembly from dirt and dust and prevent undesired access to the light assembly.

In particular, the cover can be designed as a piece which can be inserted separately into the rail profile, and can be partially or completely light-transmissive.

In a further embodiment of the lighting apparatus, two or more light assemblies are held in the rail profile, in particular on the end side and preferably adjacent to one another substantially without any intermediate space. Furthermore, in this embodiment the cover extends along a longitudinal direction of the rail profile over more than one of the light assemblies. This makes it possible to arrange a plurality of light assemblies as insets in a line together, in particular in a substantially seamless manner. The interior of the rail profile with the received insets can then be covered with a continuous light-transmissive cover and a continuous light band can thereby be produced. The light band produced can be e.g. several meters long.

In another embodiment, the light assembly can have a reflector or a reflector arrangement.

In yet another embodiment, the light assembly can have one or a plurality of emitters which can be oriented.

In one embodiment of the lighting apparatus, a conductor device for providing an electrical supply voltage and/or control signals is arranged on the rail profile, in particular in the region of a base thereof. In this embodiment, the light assembly is connected to two or more mounting arrangements to form a module, and the module is held in the rail profile by means of the mounting arrangements. In this case, at least one of the mounting arrangements is formed, together with a contacting device, as one unit and conductors of the conductor device are contacted by means of the contacting device. In this case, the light assembly can have in particular light-generating devices and an operating unit which is coupled to the contacting device in order to supply the light-generating devices. In an advantageous manner, such a lighting apparatus is simple and flexible to assemble and supply. For example, the rail profile can be assembled in advance and the module can then be inserted without any problems, particularly at any point along the rail profile. Position adjustment in the longitudinal direction of the rail profile can likewise be made possible and contributes to a flexible structure.

In an alternative embodiment, the contacting device can be provided separately from the mounting arrangements and in this case e.g. can be connected to the light assembly as an independent unit or can be designed together with the operating device as one unit.

The above embodiments and developments can be combined with each other in any manner if it is useful to do so. Further possible embodiments, developments and implementations of the invention also comprise non-explicitly-mentioned combinations of features of the invention which have been described or will be described hereinafter with reference to the exemplified embodiments. In particular, in this regard a person skilled in the art will also add individual aspects as improvements or complements to the respective basic form of the present invention.

It is understood that the embodiments and developments described above in relation to the mounting arrangement can be applied in an analogous manner to the lighting apparatus, and vice versa.

BRIEF DESCRIPTION OF THE FIGURES

The invention will be explained in more detail hereinafter with the aid of the exemplified embodiments shown in the figures of the drawings. In the drawings.

Figure 1:
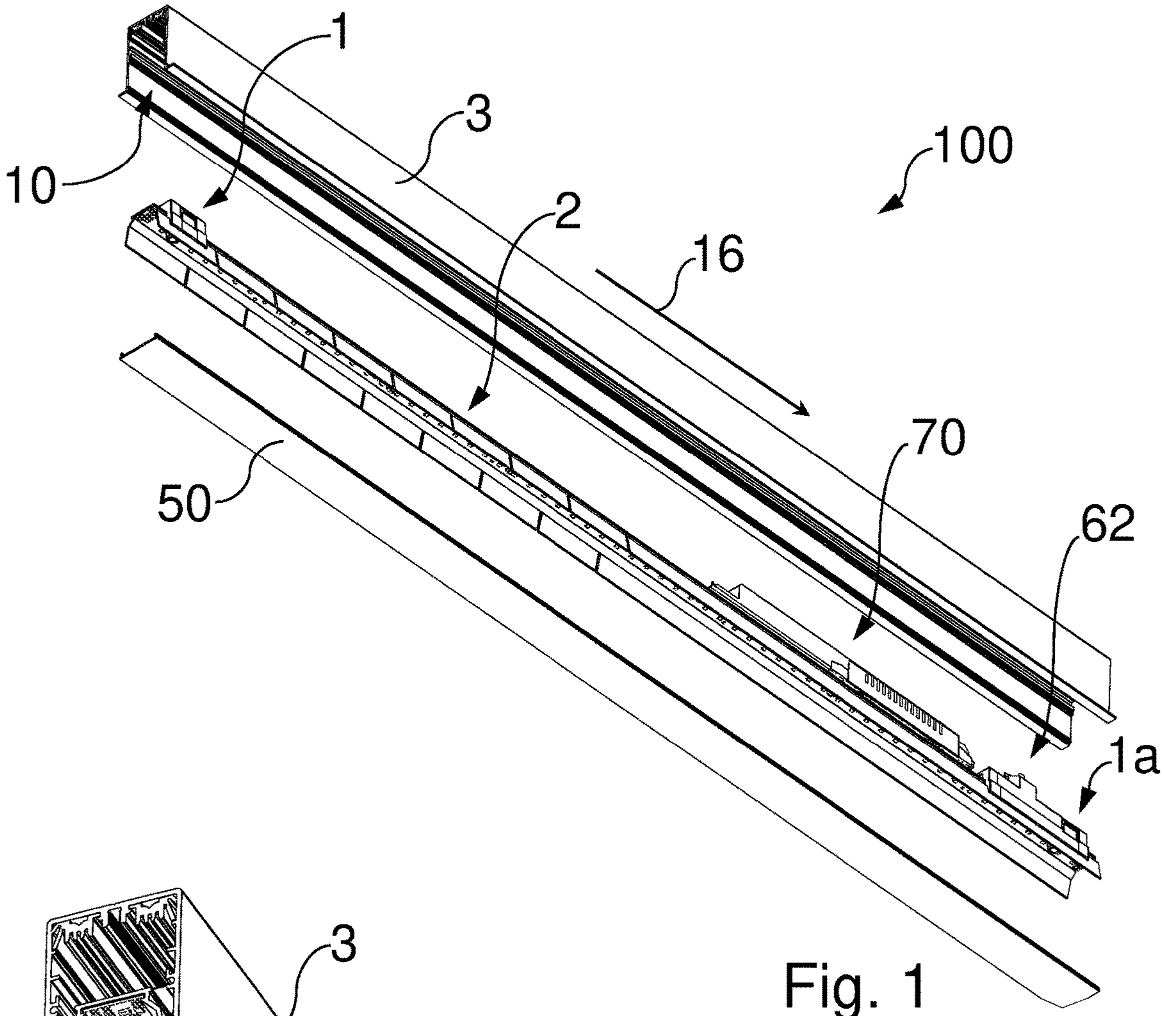
FIG. 1 shows an exploded view of a lighting apparatus according to a first exemplified embodiment comprising a rail profile, a light assembly, mounting arrangements and a cover, as seen in perspective from a visible side.

The attached drawings are intended to provide improved understanding of the embodiments of the invention. They illustrate embodiments and are used in conjunction with the description to explain principles and concepts of the invention. Other embodiments and many of said advantages will be apparent in view of the drawings. The elements in the drawings are not necessarily illustrated to scale with respect to each other.

In the figures, like and functionally identical elements, features and components and elements, features and components acting in an identical manner are provided with the same reference signs, unless indicated otherwise.

DESCRIPTION OF EXEMPLIFIED EMBODIMENTS

FIG. 1 shows a part of a lighting apparatus 100 according to a first exemplified embodiment, partially in an exploded view. The lighting apparatus 100, shown in the assembled state in FIG. 4, has an elongated rail profile 3 with a longitudinal direction 16, an elongate light assembly 2 and an elongated cover 50. The lighting apparatus 100 can be part of a profile light system. For example, the lighting apparatus 100 can be designed as a continuous light strip having a length, along the direction 16, of several meters.

The rail profile 3 has an open longitudinal side 10 which is arranged in an assembled state on a visible side of the apparatus 100. For example, the open longitudinal side 10 faces a space which is to be lit. The open longitudinal side 10 can be an underside of the assembled apparatus 100.

The profile 3 can be closed on the open longitudinal side 10 by means of the cover 50, wherein the cover 50 can be inserted separately into the rail profile 3 and is partially or preferably completely light-transmissive.

In the first exemplified embodiment, the cover 50 is provided on its inner side along the longitudinal edges of the cover 50 with rib-shaped protrusions which permit latching into the profile 3 in order to hold the cover 50.

A length of the cover 50 can correspond e.g. substantially to a length of the profile 3 along the direction 16 and so the open side 10 is closed substantially completely by means of the cover 50. Light which is provided by the light assembly 2 is output through the cover 50 in order to provide lighting. It is also conceivable to have a plurality of individual covers 50 which are arranged in a line together.

Whereas FIG. 1 shows only one light assembly 2, it is possible e.g. for two or more substantially similar light assemblies 2 to be arranged within the rail profile 3 adjacent to one another on the end face and substantially without any intermediate space. In this case, the cover 50 can extend along the longitudinal direction 16 over a plurality of light assemblies 2.

In cross-section, the rail profile 3 is substantially U-shaped having side walls 3*a*, 3*b* and a midsection which connects said side walls. Arranged on a base of the rail profile 3, in the region of the midsection which couples the walls 3*a*, 3*b*, is a conductor device 60 having conductors 61 which are held by insulating carrier bodies. The conductors 61 are intended to provide an electrical supply voltage and control signals.

In the first exemplified embodiment, the light assembly 2 is designed as a unit comprising a printed circuit board 19, an operating unit 70 and a channel-like, profile-shaped carrier component 18 and is connected to two mounting arrangements 1 and 1*a* to form a module ("inset"). In variants of the exemplified embodiment, more than two mounting arrangements 1 can be provided, wherein, when the light assembly 2 is of a relatively short length, it is also conceivable to have a design with only one mounting arrangement 1 or 1*a*. The mounting arrangement 1*a*, shown in FIG. 1 at the right end of the module, is designed together with a contacting device 62 as one unit, see also FIG. 11. The mounting arrangement 1, shown in FIG. 1 at the left end of the module is shorter in the longitudinal direction 16 than the arrangement 1*a* and does not include a contacting device.

The contacting device 62 is designed having contact elements 63 which, during insertion of the module with the light assembly 2 into the profile 3, comes in each case into electrically conductive contact with the conductors 61. In this case, each contact element 63 contacts one of the conductors 61, wherein, in the first exemplified embodiment, four conductors 61 and four contact elements 63 are intended to provide the supply voltage and a DALI signal. Specifically, in FIG. 2, the laterally outer two conductors 61 can supply a DALI signal, the inner two conductors can supply zero and phase of an alternating voltage supply, approximately in the order from left to right: DALI-Phase-Zero-DALI. When the profile 3 is in a state assembled in the ceiling region, the conductor device 60 is arranged in an upper region thereof.

Figure 2:
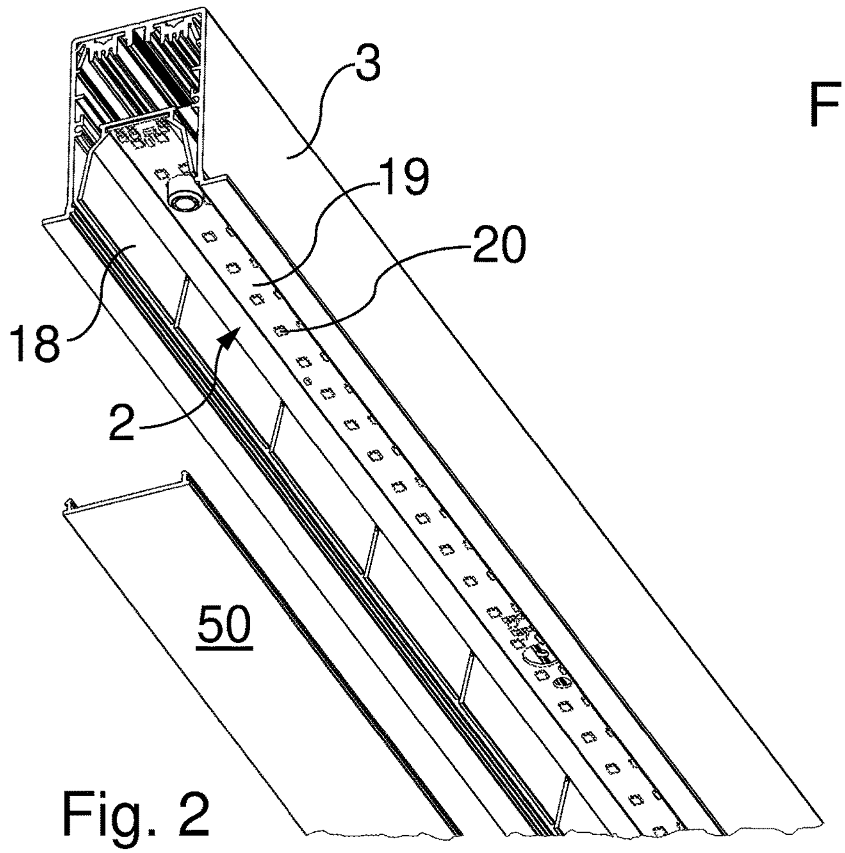
FIG. 2 shows a part of the lighting apparatus of FIG. 1 with the cover not yet inserted, as seen in perspective from the visible side.
Figure 3:
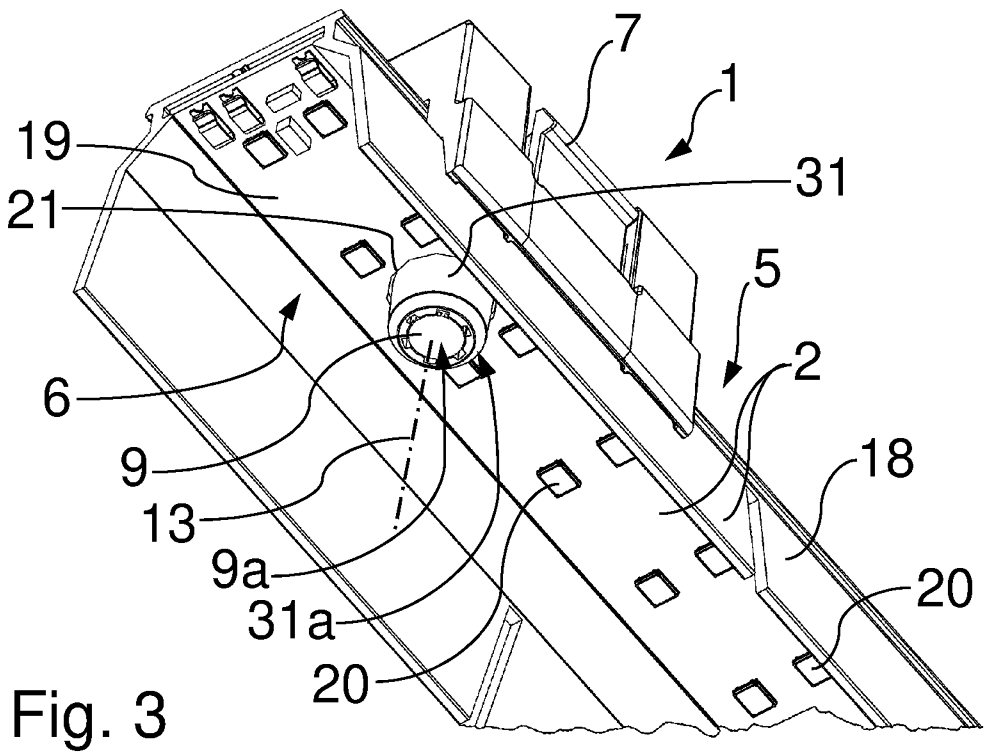
FIG. 3 shows a part of the light assembly comprising a mounting arrangement coupled thereto according to the first exemplified embodiment, as seen in perspective from the visible side.

Provided on the elongated printed circuit board 19 is a multiplicity of LED devices 20, see for instance FIGS. 2 and 3, and in particular e.g. conductor tracks for operation of the LED devices 20.

Figure 11:
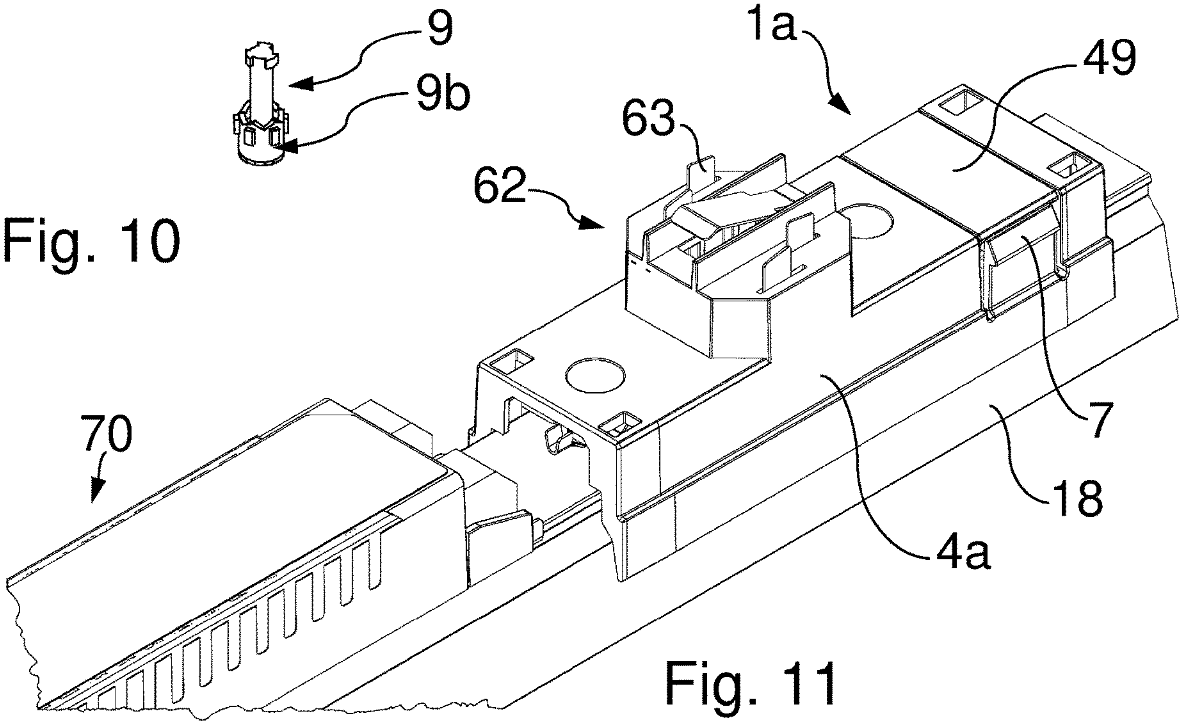
FIG. 11 shows a rear-side perspective view of another short portion of the light assembly provided in the first exemplified embodiment and having a further mounting arrangement.

By means of the contacting device 62 ("feeder"), the DALI signals and the supply voltage, which can be e.g. mains voltage, for instance alternating voltage with a rated voltage between 100 volts and 240 volts, in particular between 220 V and 240 V, are tapped by the conductor device 60 and relayed to the operating unit 70, FIG. 11. The operating unit 70 is adapted to convert the tapped alternating current at mains voltage into a voltage with a suitable type of current which is suitable for operation of the light assembly 2, and in particular the LED devices 20 thereof. The operating unit 70 and the contacting device 62 are arranged on the rear side of the component 18 and, in particular, are connected thereto.

The printed circuit board 19 is received in the channel-like component 18 which, in some examples, can also be designed as a reflector 18 for directing the light, which is emitted by the LED devices 20 during operation, in the direction of the open side 10. In particular, the component 18 can also be considered to be a type of housing component for receiving the printed circuit board 19.

The light assembly 2 comprising the printed circuit board 19, the operating unit 70 and the reflector 18 is held in the rail profile 3 by means of the mounting arrangements 1 and 1*a*. The mounting arrangements 1 and 1*a* of the lighting apparatus 100 are designed in a similar manner with regard to the devices for mechanically holding the light assembly 2 in the rail profile 3 and differ substantially in that the arrangement 1*a* is enlarged in comparison with the arrangement 1 for accommodating the contacting device 62, see for instance FIGS. 6 and 11.

During assembly of the apparatus 100, after attachment of the rail profile 3 e.g. in the ceiling region, the assembly 2 comprising the mounting arrangements 1, la arranged thereon is inserted from the open side 10 into the rail profile 3, whereby the conductors 61 are contacted by the contact elements 63. Once completely inserted, the light assembly 2 is already held automatically in the profile, as described hereinafter. Then, the light assembly 2 is finally fixed, as will be likewise explained hereinafter, and the cover 50 is inserted.

The mounting arrangements 1, 1*a* are mechanically coupled to the light assembly 2 by latching, see FIGS. 3-11. In this case, the mounting arrangement 1 is designed having a body 4 with a substantially U-shaped cross-section. The body 4 is manufactured e.g. from a synthetic material. The U-shape of the body 4 with limbs 45 forms an inner region 44 of the body 4, see for instance FIGS. 9 and 10.

Figure 4:
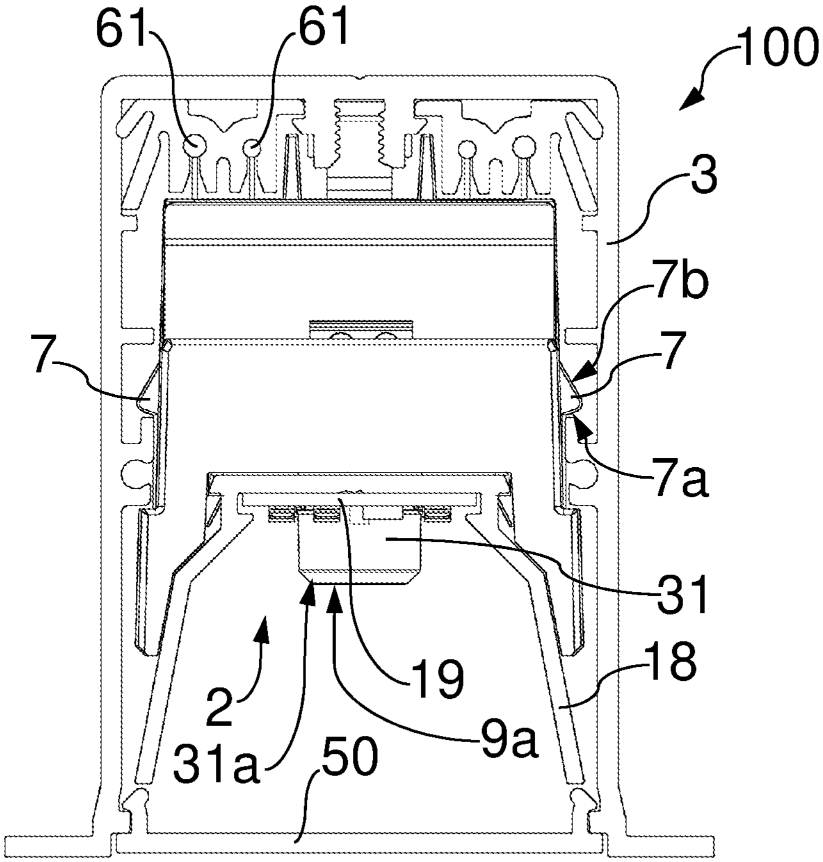
FIG. 4 shows the assembled lighting apparatus according to the first exemplified embodiment in an end-face view.
Figure 5:
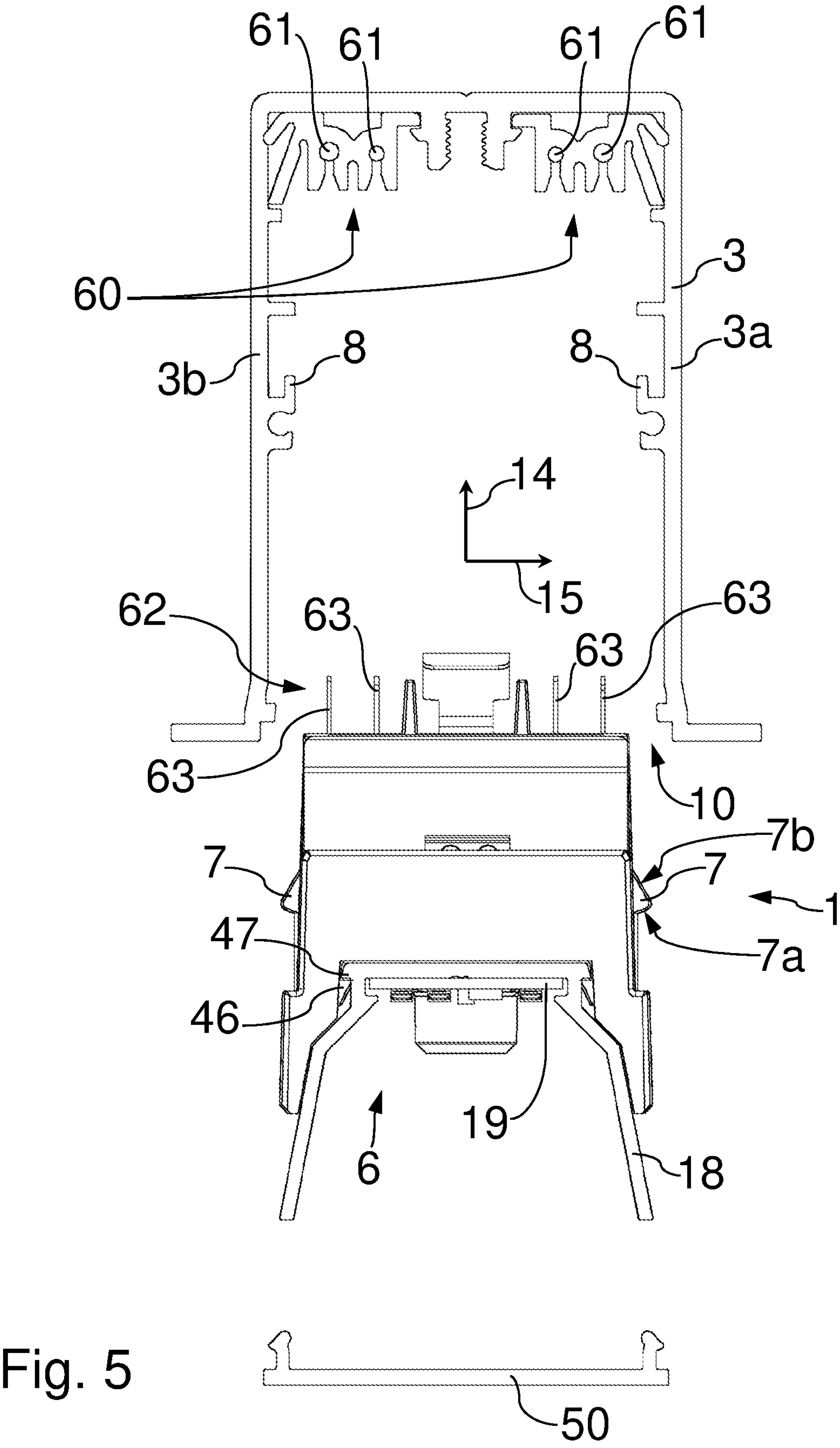
FIG. 5 shows the parts, shown in FIG. 1, in an end-face view.
Figure 6:
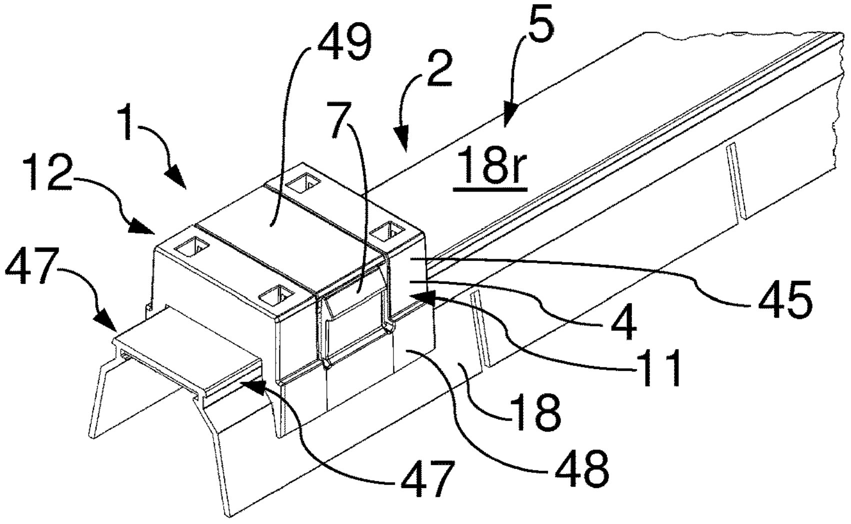
FIG. 6 shows a rear-side perspective view of a short portion of the light assembly provided in the first exemplified embodiment and having the mounting arrangement shown in FIG. 2.
Figure 7:
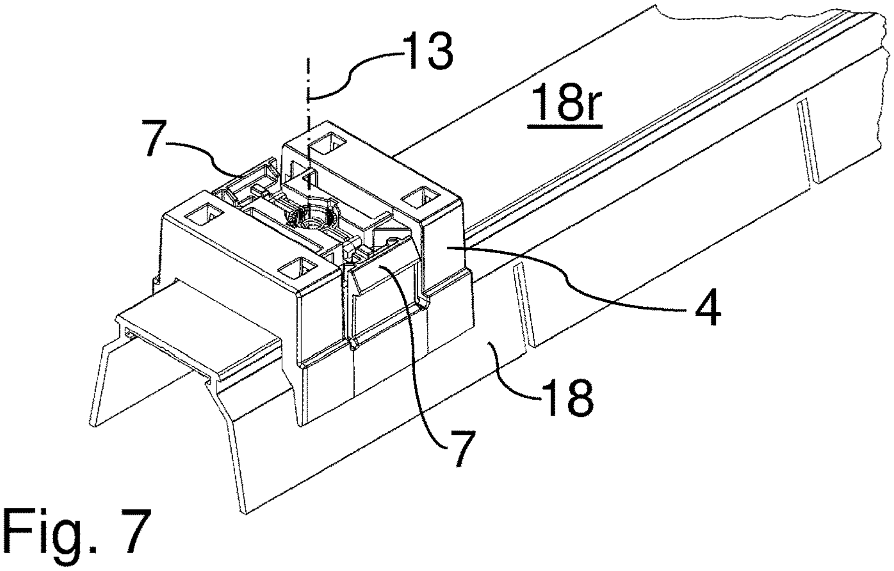
FIG. 7 shows the situation of FIG. 6, wherein a cover element of the mounting arrangement is omitted for illustrative purposes.

The channel-like component 18 with the printed circuit board 19 received therein is overlapped on the rear side from a rear side region 5 of the light assembly 2 in a portion thereof along the longitudinal direction 16, see in particular FIGS. 3 to 7. The rear side region 5 faces away from a light-emitting side 6 of the light assembly 2, on which the LED devices 20 are arranged on the printed circuit board 19. FIGS. 6, 7 show the rear side 18*r* of the carrier component 18.

The overlapped portion of the light assembly 2, and in this case a longitudinal portion of the carrier component 18, is received in the inner region 44 of the body 4. The mechanical coupling of the body 4 to the component 18 is effected with the aid of four latching elements 46 which are arranged on the body 4 facing the inner region 44 and of which in each case two engage in a latching manner behind one of two opposite upper, outer longitudinal edges 47 of the carrier component 18.

The printed circuit board 19 is held at the edge in two opposite longitudinal grooves of the component 18, see FIGS. 3 to 5.

The mounting arrangement 1 has a latching device 17 with two elastically resilient latching elements 7 which are formed in one piece with the body 4 on opposite sides 11, 12 thereof. Each of the limbs 45 is designed having a longitudinally contiguous region 48, one longitudinal boundary of which forms a free edge of the limb 45 and the other longitudinal boundary of which is connected in one piece to the resiliently movable latching element 7 in a center region, as seen in the longitudinal direction 16 when the apparatus 100 is in the assembled state.

The latching elements 7 are adapted to engage in a latching manner in each case behind an edge 8 extending along the inside of the rail profile 3, or behind an undercut 8 of the rail profile 3 extending along the inside of the rail profile 3 and thereby to hold the light assembly 2 in the profile 3. In this case, the edges or undercuts 8, behind which the latching elements 7 engage, are provided on opposite sides of the profile 3 on the inner side on the opposite side walls 3*a*, 3*b*.

Furthermore, FIGS. 4, 5 show e.g. that inclined latching surfaces 7*a* of the latching elements 7, which co-operate with the edges or undercuts 8, are arranged above or on the rear side of a plane, in which the printed circuit board 19 is received in the inner region 44, as seen in the depth direction 14 of the profile 3 in the assembled state. FIGS. 4, 5 also show inclined sliding ramp surfaces 7*b* which are provided in each case on the latching elements 7. The sliding ramp surfaces 7*b* are more flatly inclined relative to the depth direction 14 than the latching surfaces 7*a* and allow problem-free engagement behind the edges or undercuts 8 during the insertion procedure.

Figure 8:
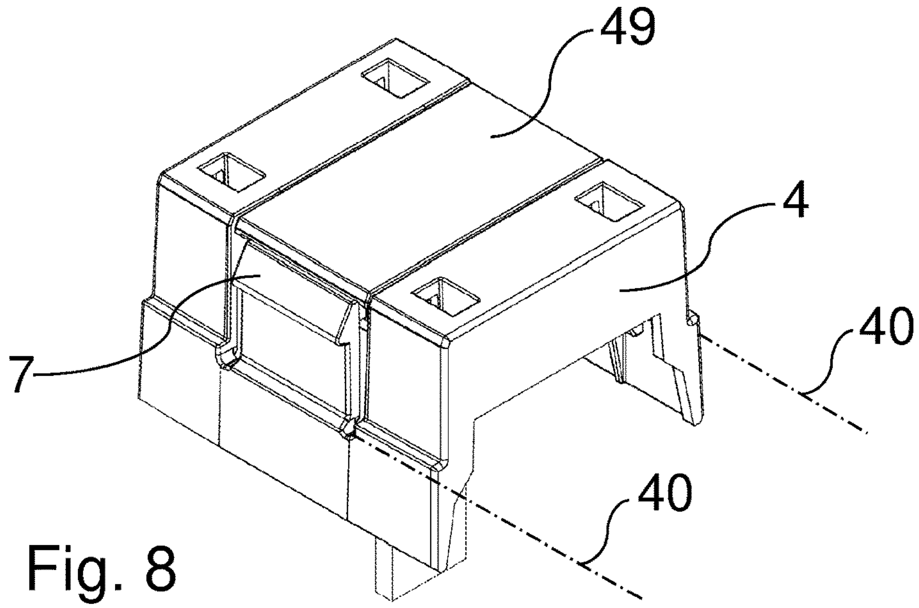
FIG. 8 shows the mounting arrangement, shown in FIGS. 6 and 7, in a perspective view.
Figure 9:
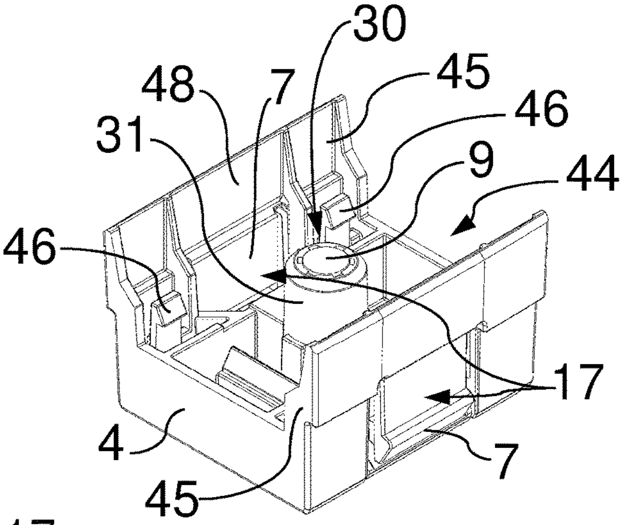
FIG. 9 shows the mounting arrangement of FIGS. 6 to 8 in another perspective view, as seen from an inner side of a body thereof.

The latching elements 7 of the latching device 17 which are formed in one piece with the body 4 are elastically pivotable in each case about a pivot axis 40, see FIG. 8. When the lighting apparatus 100 is in the assembled state, the pivot axis 40 is in each case in parallel with the longitudinal direction 16 of the rail profile 3.

Pressing the latching elements 7 into the body 4 in the transverse direction 15 thus requires an elastic force effect to be overcome, said force being able to be suitably adapted in particular by selecting the material of the body 4 and the dimensioning of the connection of the latching elements 7 to the body 4. FIGS. 4, 5 show that the latching surfaces 7*a* are not oriented perpendicularly to the depth direction 14 but likewise extend in an inclined manner such that, by applying a sufficient pulling force to the mounting arrangement 1, e.g. imparted via the carrier component 18, in the direction opposite the depth direction 14, the latching of the latching elements 7 to the edges or undercuts 8 can be released. However, without the operator or fitter applying the pulling force, the latching elements 7 remain under the elastic force effect in the holding position thereof behind the edges or undercuts 8 and thus hold the module with the light assembly 2 automatically in the profile 3.

The mounting arrangement 1 has a blocking arrangement 30 which can be moved by the operator to a release configuration and to a blocking configuration. For this purpose, the blocking arrangement 30 comprises an actuating element 9 which, in a state in which the mounting arrangement 1 together with the mounting arrangement 1*a* holds the light assembly 2—inserted into the rail profile 3—in the profile 3, can be actuated by the operator from the open side 10 if the cover 50 is not inserted or removed. The mounting arrangement 1*a* likewise has a latching device 17 and a blocking arrangement 30 which are designed and function in the manner of the mounting arrangement 1.

At the beginning of the assembly of the module, which is formed with the light assembly 2 and the mounting arrangements 1, 1*a*, in the rail profile 3, the blocking arrangements 30 of the arrangements 1 and 1*a* are each located in their release configuration. After insertion of this module into the rail profile 3, the latching device 17 engages into the rail profile 3, wherein the latching elements 7 latch behind the edges or undercuts 8. In this state, the module is already held automatically in the profile 3. Then, the operator actuates the actuating elements 9 of each of the arrangements 1, 1*a* e.g. one after the other manually and without the use of a tool, whereby each of the blocking arrangements 30 is moved to its blocking configuration.

Whereas, in the release configuration, the latching elements 7 can thus be brought into engagement with the edges or undercuts 8 by overcoming the elastic force effect, and the engagement can then also be released by simply pulling on the module in the direction opposite the depth direction 14, this is no longer possible in the blocking configuration. In the blocking configuration, a movement of the latching elements 7 against the elastic force effect is restricted or prevented at least to such an extent that engagement of the latching elements 7 in each case behind the edge or the undercut 8 cannot be effected, nor can such an existing engagement be released. Therefore, in the blocking configuration of the blocking arrangement 30, the module formed with the light assembly 2 is secured against being unintentionally released.

After actuation of the actuating elements 9, the cover 50 can be inserted into the rail profile 3, wherein the cover 50 then covers the actuating elements 9, see FIG. 4. Preferably, the cover 50 is light-transmissive and opal in order to form a light band.

The blocking arrangement 30 can be transferred to the blocking configuration and the release configuration in a convenient manner without tools by exerting a pressure force onto the actuating element 9 in parallel with the depth direction 14, e.g. using a finger. By press-actuating multiple times in this manner, the blocking arrangement 30 is switched in an alternating manner to the release configuration and the blocking configuration. The pressing is effected in this case against an elastic force which, as described hereinafter, is provided by spring elements, wherein the actuating element 9 is displaced against the clastic force.

FIG. 3 shows e.g. that the mounting arrangement 1 has a guide portion 31 which is designed in the manner of a sleeve and protrudes through a round through-opening 21 in the printed circuit board 19. In the guide portion 31, the actuating element 9 can be displaced for actuation purposes, as described above. FIG. 3 shows an displacement position of the actuating element 9 for the blocking configuration. An end-face actuating surface 9*a* of the actuating element 9 is accessible from the light-emitting side 6 of the light assembly 2 if the cover 50 is not inserted and, in FIG. 3, is substantially flush with an end 31*a* of the guide portion 31 which, after insertion of the cover 50, faces the cover 50, see also FIG. 4. Actuation is effected by pressing onto the surface 9*a*.

Figure 10:
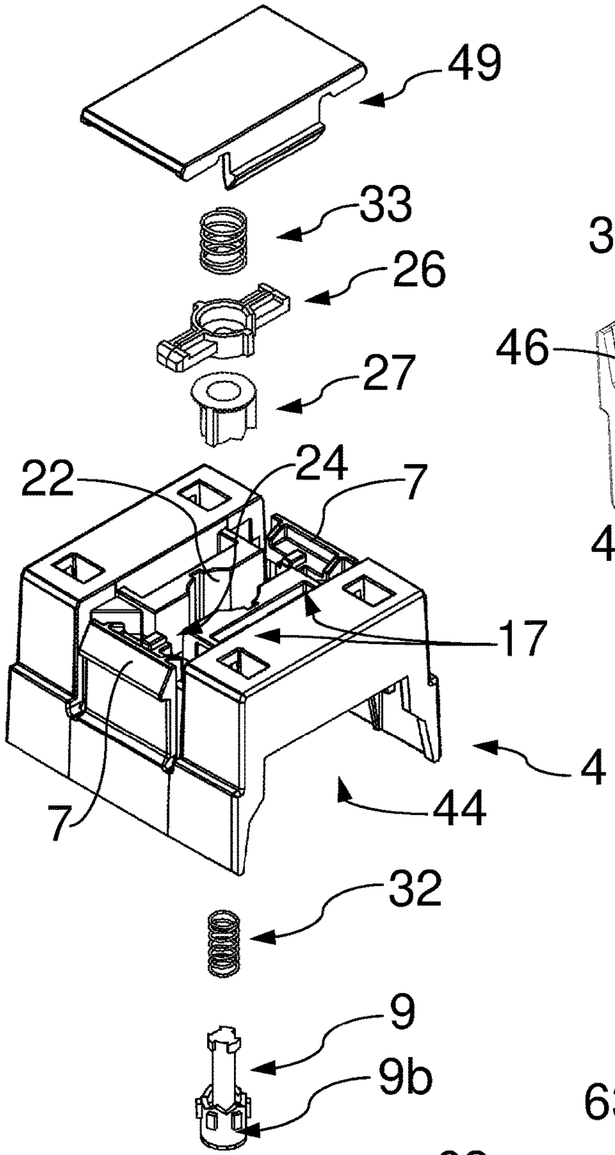
FIG. 10 shows an exploded view of the mounting arrangement of FIGS. 6 to 8.

Adjacent to the actuating surface 9*a*, the actuating element 9 has a circumferential surface portion 9*b*, see FIG. 10, which can extend e.g. along the entire circumference of the actuating element 9 and is designed as a signal surface having a warning colour, e.g. a bright, noticeable red. When the blocking arrangement 30 is in the release configuration, the actuating element 9 protrudes slightly out of the guide portion 31 via the end 31*a*, whereby the circumferential surface portion 9*b* is visible and makes the operator/fitter aware that the latching devices 17 are not yet blocked. This can prevent the situation where actuation of the actuating elements 9 is forgotten before the cover 50 is inserted. When the cover 50 is in the inserted state, it covers the guide portion 31 and the actuating surface 9*a* on the visible side.

In a second and third exemplified embodiment which are described hereinafter, a blocking arrangement 30' is provided which differs from the blocking arrangement 30 merely in the design of the actuating element 9'. The structure of the blocking arrangement 30' and its function and effect on the latching device 17 are described in more detail further below, wherein it is understood that the structure, function and mode of operation apply in the same manner to the blocking arrangement 30 apart from the difference in the shape of the actuating element.

In the lighting apparatus 100' according to the second exemplified embodiment and illustrated in FIGS. 12 to 16, a light assembly 2' is provided which has a reflector arrangement 80' having a plurality of funnel-like reflector portions 81'. The reflector portions 81' open in each case towards a light-emitting side 6' of the light assembly 2'. The reflector arrangement 80' is mounted on a profile-shaped carrier component 18' and is encompassed thereby on the rear side, see FIGS. 13, 16. Furthermore, the light assembly 2' has in particular light-generating devices which are designed as LEDs on a suitable printed circuit board, wherein the LEDs and printed circuit board are not explicitly designated for the second exemplified embodiment.

Figure 12:
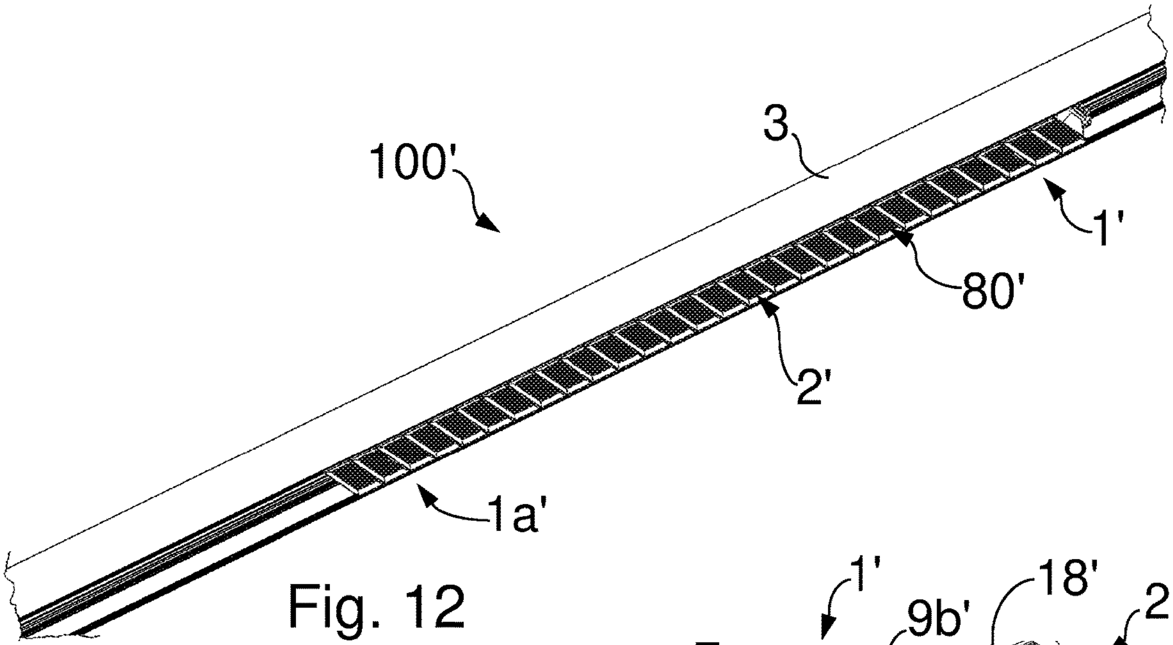
FIG. 12 shows a part of a lighting apparatus according to a second exemplified embodiment in a perspective view from a visible side.

In a similar manner to the carrier component 18 of the first exemplified embodiment, the carrier component 18' is overlapped in a rear-side region 5' of the light assembly 2' by the body 4, 4*a* of two mounting arrangements 1' and 1*a'* and is latched to the body 4 and 4*a* in each case by means of latching elements 46. The positions of the mounting arrangements 1', 1*a'* are indicated in FIG. 12.

A narrow elongate opening 85' is formed between two adjacent reflector portions 81'. In the second exemplified embodiment, the opening 85' is incorporated into a rib-shaped bead which is formed by the funnel shape of the two adjacent reflector portions 81'. In total, the lighting apparatus 100' has two such openings 85'.

Figure 13:
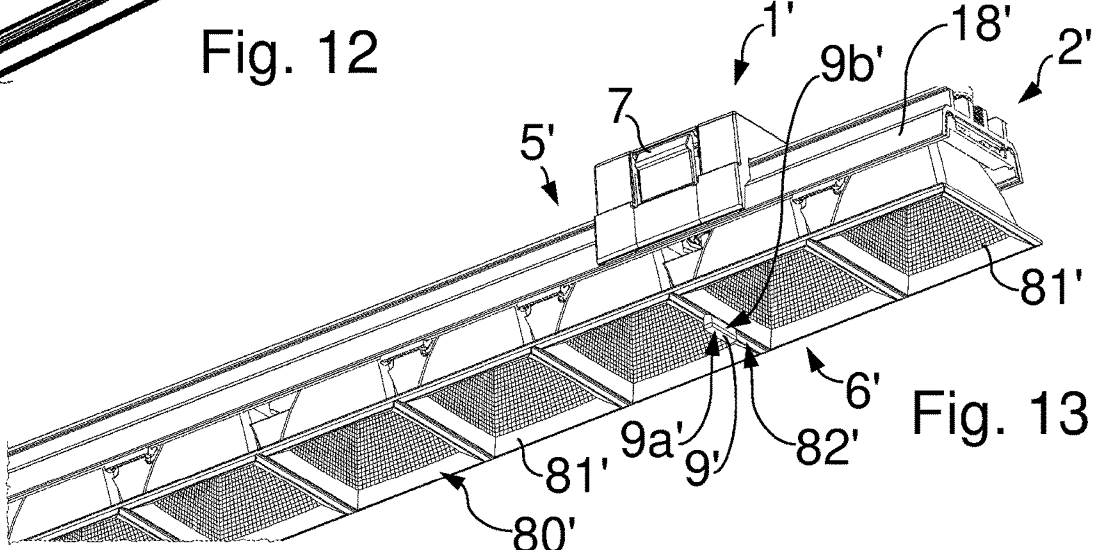
FIG. 13 shows a part of the light assembly comprising a mounting arrangement coupled thereto according to the second exemplified embodiment, in perspective from the visible side, wherein a blocking arrangement of the mounting arrangement is located in a release configuration.

An actuating element 9' of the blocking arrangement 30' of the mounting arrangement 1' protrudes on the outer side through one of the openings 85' if the blocking arrangement 30' of the arrangement 1' is located in the release configuration, see FIG. 13. An actuating element 9' of the blocking arrangement 30' of the mounting arrangement 1*a'* protrudes in a similar manner on the outer side through the other one of the openings 85' if the blocking arrangement 30' of the arrangement 1*a'* is located in the release configuration. In contrast, the actuating elements 9', in each case when the blocking arrangements 30' are in the blocking configuration, are flush with the visible-side surface 82' of the reflector arrangement 80' in the region of the bead between the adjacent reflector portions 81', see FIGS. 14 and 15.

Figure 14:
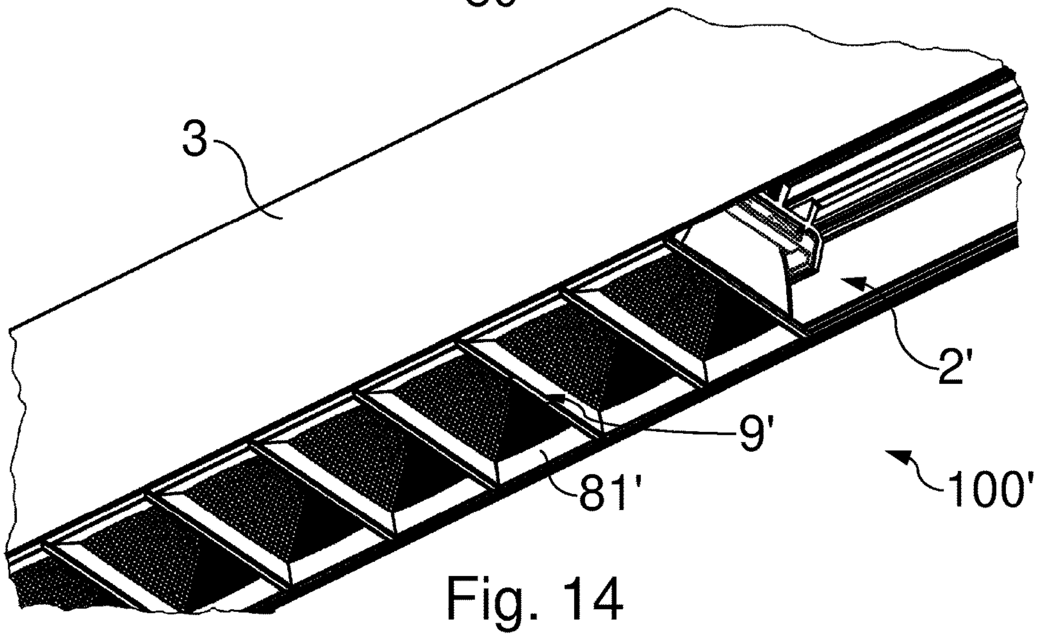
FIG. 14 shows a part of the light assembly of FIG. 13 which is mounted in a rail profile as in FIG. 12, wherein a blocking arrangement of the mounting arrangement is located in a blocking configuration.
Figure 15:
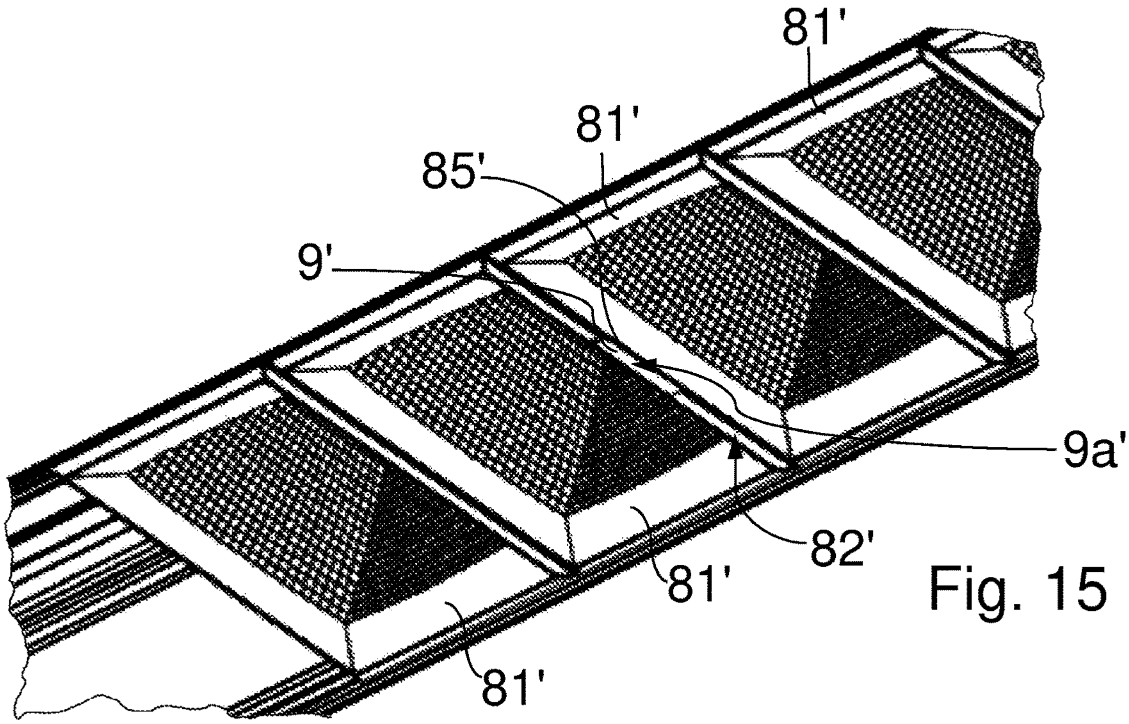
FIG. 15 shows another part of the light assembly of FIG. 14 which is fixed in the rail profile, wherein a blocking arrangement of a further mounting arrangement is located in a blocking configuration.
Figure 16:
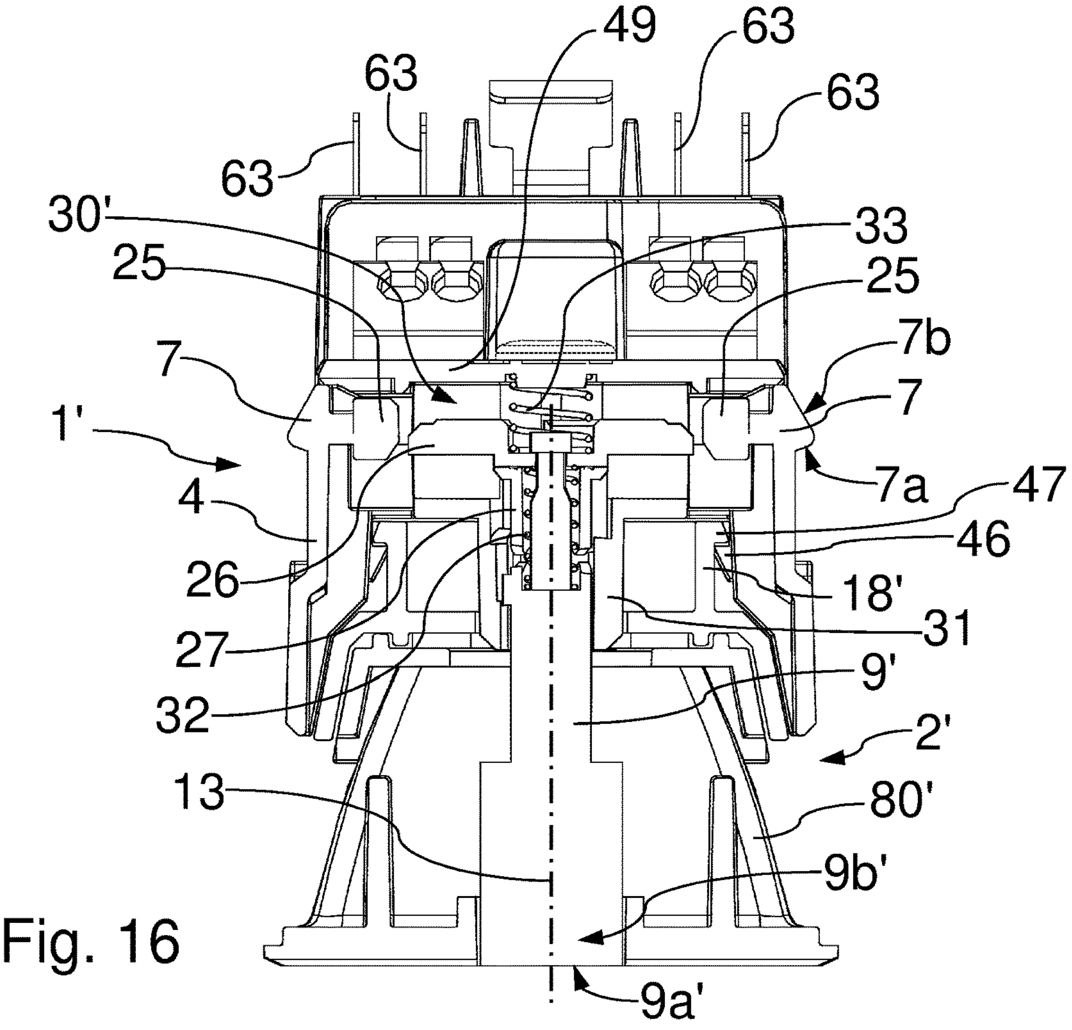
FIG. 16 shows an end-face view of a light assembly and mounting arrangements coupled thereto according to the second exemplified embodiment.

In the state shown in FIGS. 14, 15, the latching elements 7 are thus blocked to prevent unintentional release. In this case, an end-face actuating surface 9*a'* is substantially flush with the surface 82' and is thus unnoticeable aesthetically, but at the same time can be accessed by the operator for transferring the blocking arrangement 30' to the release configuration for the purpose of manual actuation without tools.

In contrast, in the state shown in FIG. 13, the establishment and release of the mechanical connection is effected by means of the latching elements 7. Adjacent to the actuating surface 9*a'*, each actuating element 9' has a circumferential surface portion 9*b'* which can extend e.g. along the entire circumference of the actuating element 9' and is designed as a signal surface having a warning colour, e.g. a bright, noticeable red. In the state shown in FIG. 13, the warning colour makes it clear to the operator/fitter that the latching devices 17 are not yet blocked. This can prevent the situation where the actuation of the actuating elements 9' is forgotten.

A lighting apparatus 100", see FIGS. 17 to 22, according to a third exemplified embodiment has a light assembly 2" having two adjustable emitters 90", e.g. "spots". Furthermore, the light assembly 2" comprises a housing 95", to which the emitters 90" are pivotably coupled. In a similar manner to the first and second exemplified embodiment, the light assembly 2" can be inserted into the rail profile 3, wherein, in the inserted state, a visible-side surface 95*a"* of the housing 95" terminates substantially flush with the rail profile 3 on the open longitudinal side 10 thereof, see e.g. FIGS. 17, 18. The emitters 90" have light-generating devices, not shown in greater detail, designed e.g. as LEDs.

Figure 19:
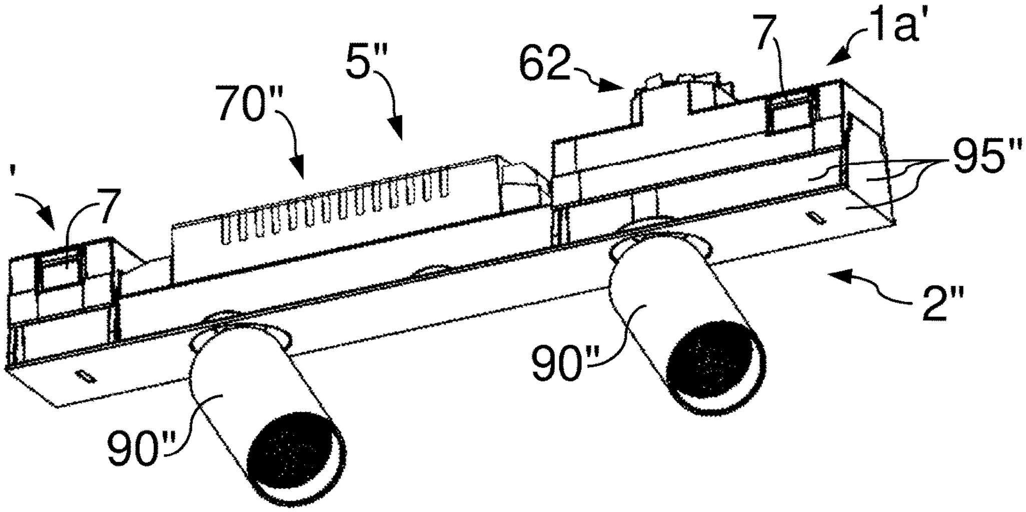
FIG. 19 shows a light assembly of the third exemplified embodiment comprising the mounting arrangements and a contacting device and an operating unit.

Furthermore, the light assembly 2" comprises an operating unit 70" which is arranged in a rear-side region 5" of the light assembly 2", see FIG. 19. Moreover, the light assembly 2" is connected to a first mounting arrangement 1' and a second mounting arrangement 1*a'* to form a module which can be inserted into the rail profile 3. FIG. 19 shows the module formed in this manner.

The housing 95" has, on the visible side in the surface 95*a"*, two openings 96", one of which is allocated to the actuating element 9' of the mounting arrangement 1' and the other of which is allocated to an actuating element 9' of the mounting arrangement 1*a'*.

The mounting arrangements 1', 1*a'* and actuating elements 9' correspond to those described above with respect to the second exemplified embodiment, wherein, in the third exemplified embodiment, the bodies 4, 4*a* of the mounting arrangements 1', 1*a'* are coupled mechanically by latching to a rear-side housing component 98" of the housing 95" by means of the latching elements 46.

Figure 17:
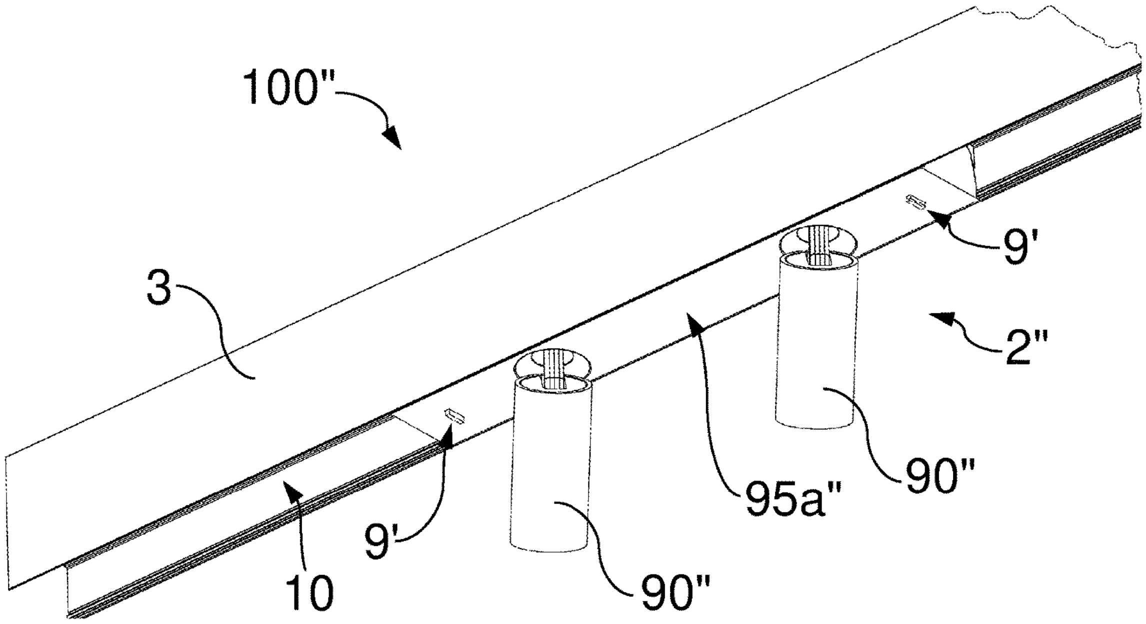
FIG. 17 shows a part of a lighting apparatus according to a third exemplified embodiment, as seen in a perspective view from a visible side, wherein a light assembly is held in a rail profile by means of mounting arrangements and blocking arrangements of the mounting arrangements are located in a release configuration.
Figure 18:
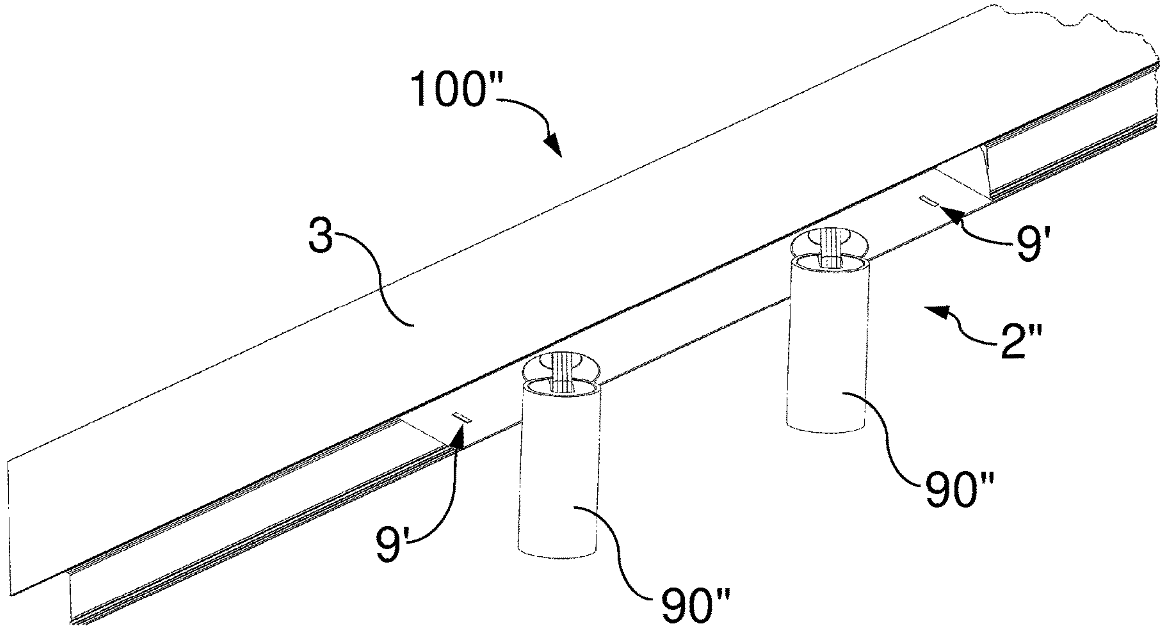
FIG. 18 shows the situation of FIG. 17, wherein the blocking arrangements are located in a blocking configuration.
Figure 20:
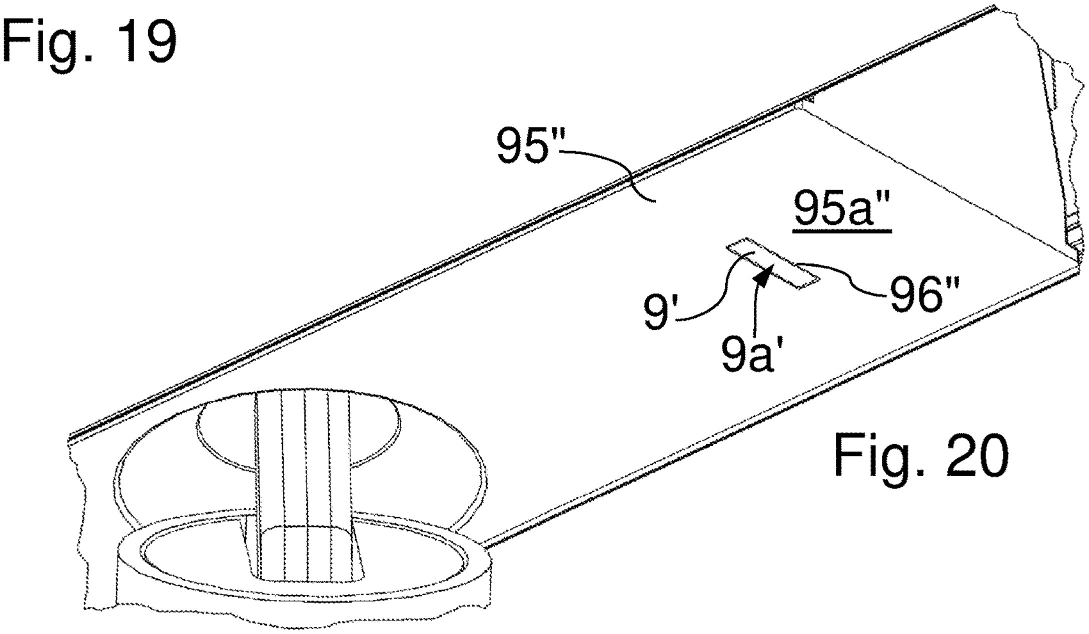
FIG. 20 shows a detail from FIG. 18 to illustrate a position of an actuating element in the blocking configuration of the blocking arrangement.
Figure 21:
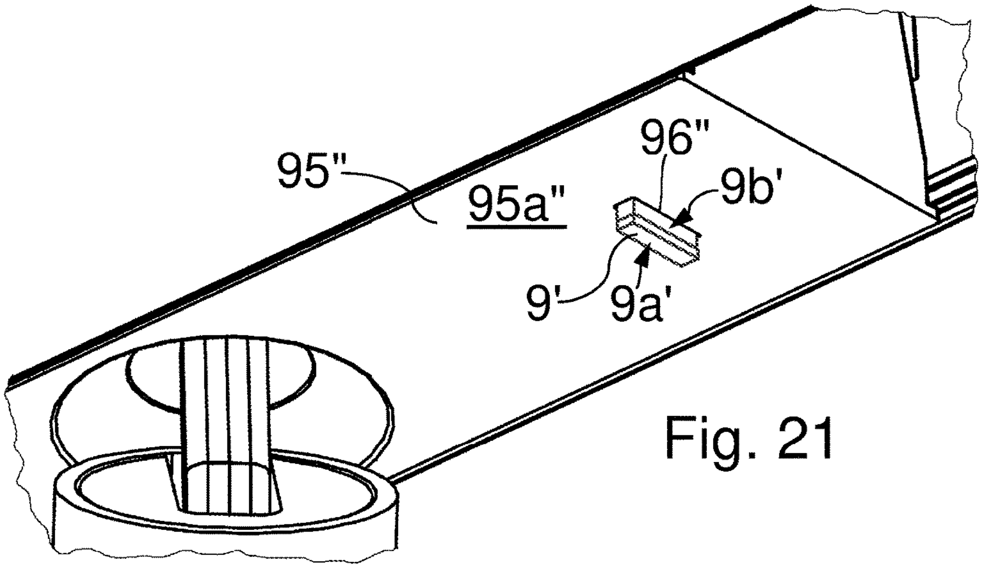
FIG. 21 shows a detail from FIG. 17 to illustrate a position of an actuating element in the release configuration of the blocking arrangement.
Figure 22:
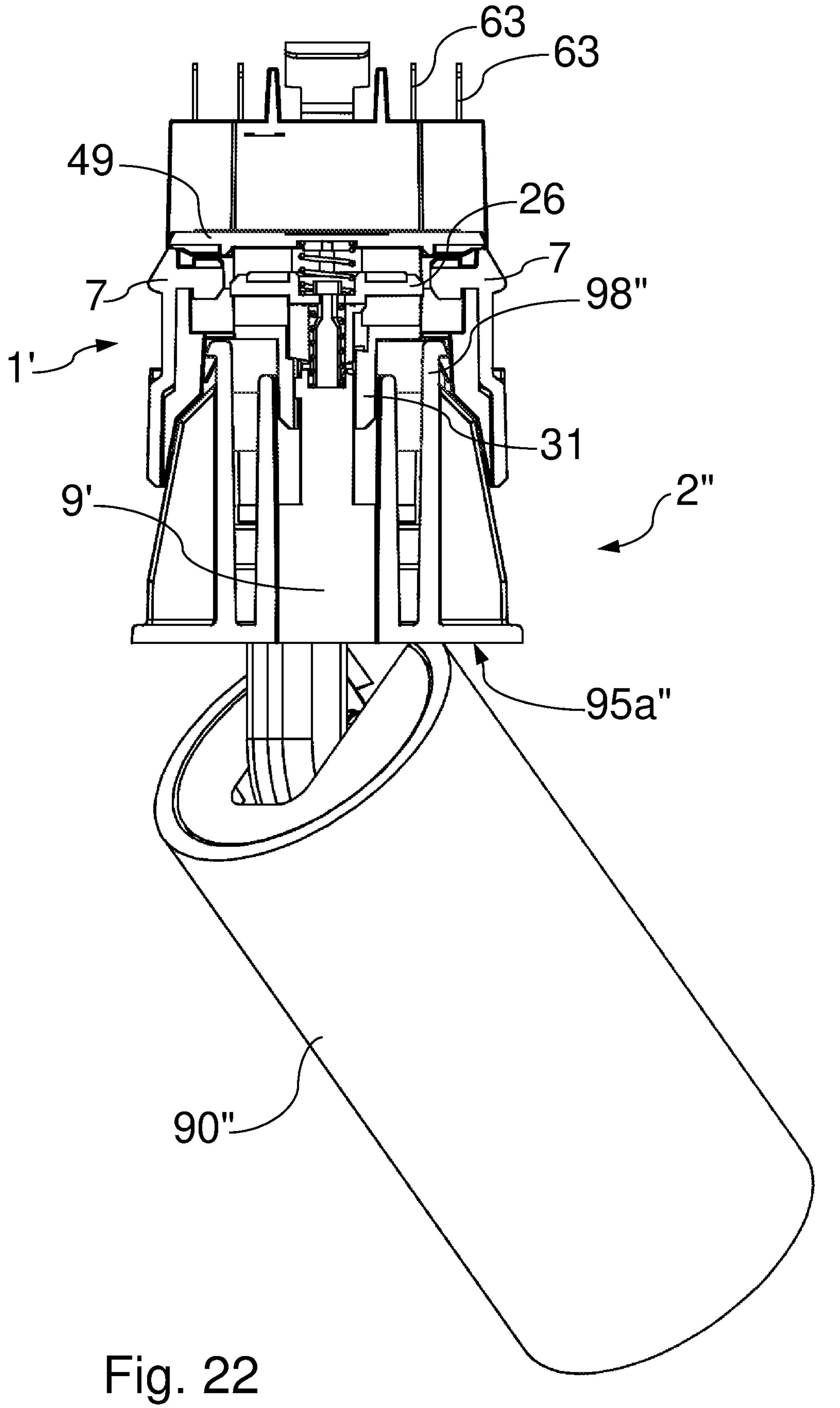
FIG. 22 shows an end-face view of the light assembly of FIG. 19.

FIGS. 17 and 21 show a position of the actuating elements 9' for the release configuration of the blocking arrangement 30', whereas FIGS. 18 and 20 show a position of the actuating elements 9' for the blocking configuration. In the blocking configuration, the actuating surface 9*a'* of the actuating element 9' is, in aesthetic terms, discretely flush with the housing surface 95*a"*, the actuating element 9' thus does not protrude via the housing surface 95", but it is possible to press the actuating element 9' manually without tools, in particular using a finger, in the state shown in FIGS. 20, 18 for the transition from the blocking configuration to the release configuration.

In contrast, in the release configuration, FIGS. 17 and 21, the actuating element 9' protrudes on the outer side from the visible-side housing surface 95*a"* through the opening 96". As in the case of the second exemplified embodiment, the actuating element 9' is adjacent to the actuating surface 9*a'* with a circumferential surface portion 9*b'* having a warning colour. Therefore, in the third exemplified embodiment the operator also recognizes quickly and unequivocally if the latching device 17 is not blocked by means of the blocking arrangement 30' to prevent unintentional release.

The mode of operation of the blocking arrangement 30' will be described hereinafter by reference to FIGS. 23 to 35, wherein the mode of operation described also applies to the blocking arrangement 30 of the first exemplified embodiment.

The actuating element 9' is guided in the body 4 so as to be displaceable in the guide portion 31 along a displacement axis 13. Arranged along the displacement axis 13 are—see e.g. FIG. 33—the actuating element 9', a sleeve 27 and a blocking element 26. The blocking element 26 is guided in a recess 22 of the body 4 so as to be likewise displaceable along the axis 13. The actuating element 9' and the blocking element 26 are prevented from rotating about the axis 13 relative to the body 4. For this purpose, the actuating element 9' has, on the outer side, a plurality of guide ribs 23 which are guided in corresponding grooves in an inner passage of the guide portion 31. Furthermore, the blocking element 26 has, on opposite sides, two flanks 26*a* which are guided in corresponding regions of the recess 22.

The sleeve 27 is arranged between functional surfaces of the actuating element 9' and the blocking element 26. In this case, the sleeve 27, the actuating element 9' and the blocking element 26 are arranged coaxially to the axis 13. The sleeve 27 has an inner passage, through which a coupling portion 28 of the actuating element 9' extends. The coupling portion 28 also extends through a central passage opening 26*b* of the blocking element 26 and engages with an end portion behind sections of the blocking element 26 in the area surrounding the central passage opening 26*b*, see FIG. 33.

The guide portion 31 is formed on the body 4 as part thereof such that the guide portion 31 protrudes in the inner region 44 into the space between the contiguous regions 48 of the two limbs 45. The body 4 is closed, on a side thereof facing away from the free end 31*a* of the guide portion 31, by means of a separate cover element 49 which is latched to the body 4.

The blocking arrangement 30' includes the actuating element 9', the sleeve 27 and the blocking element 26, the inner geometry of the guide portion 31 and also first and second spring elements 32 and 33 which are designed as compression springs in the form of helical springs. The first spring element is arranged along the axis 13 inside the inner passage of the sleeve 27 and surrounds the coupling portion 28. In this case, the first spring element 32 acts on the blocking element 26 and the actuating element 9' and applies an elastic pressure force which pretensions the elements 26 and 9' along the displacement axis away from one another. However, the spring element 32 does not act directly on the sleeve 27. The second spring element 33 is arranged along the axis 13 between the cover element 49 and the blocking element 26 and applies an elastic pressure force which pretensions the blocking element 26 away from the cover element 49.

In each case, a protrusion 25 which protrudes inwardly, towards the recess 22, is connected in one piece to each of the latching elements 7 on an inner side 24 of the latching element 7 facing the recess 22 of the inner region 44. The protrusion 25 is arranged on the latching element 7 in each case close to the free end thereof which has the latching surface 7*a* and the sliding ramp surface 7*b*. The protrusions 25 on the two latching elements 7 face one another.

Figure 33:
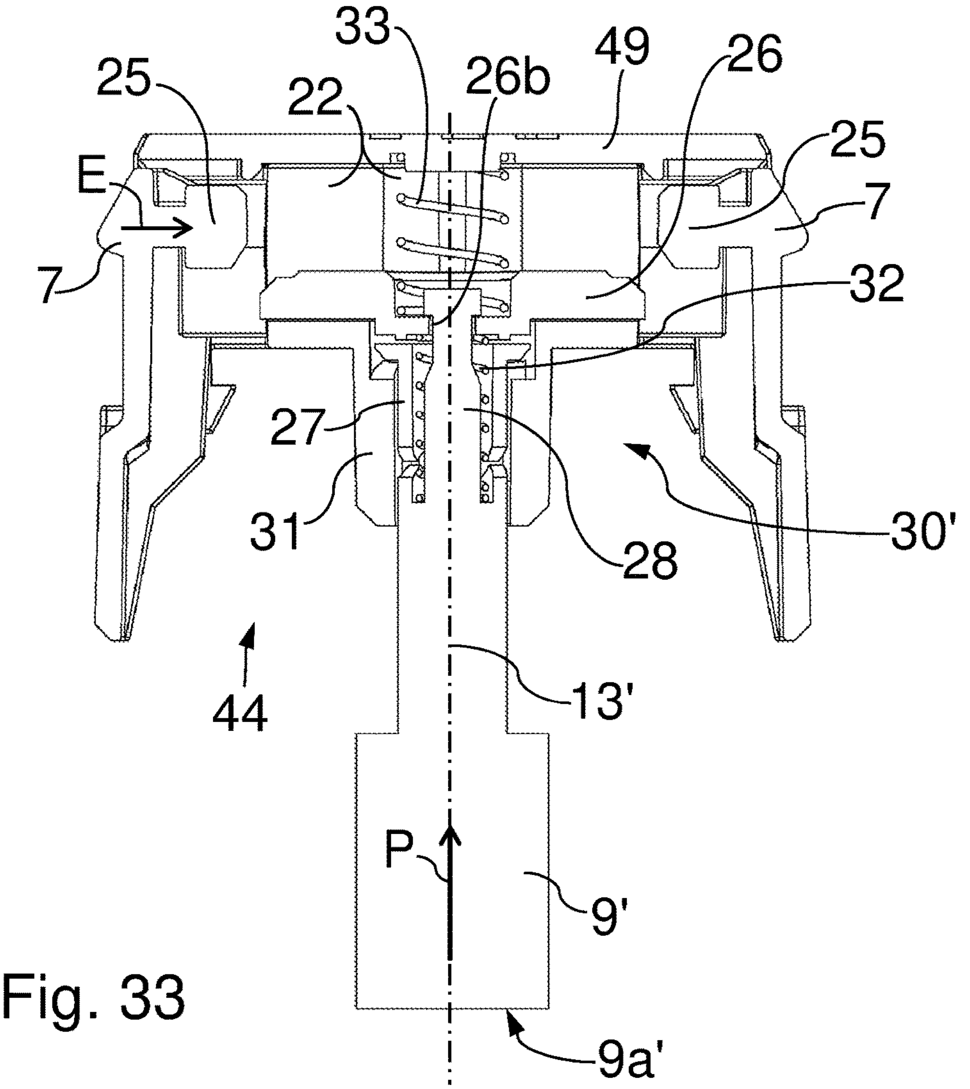
FIG. 33 shows the situation of FIG. 32 (*a*) in the mid-section of the assembled mounting arrangement.

In the release configuration, see FIG. 33, the blocking element 26 is located in a lower, first displacement position. In addition, in the release configuration the actuating element 9' is also located in its lowermost position along the axis 13. FIG. 33 shows that in the release configuration the flanks 26*a* of the blocking element 26 are disposed below the protrusions 25 and therefore do not hinder an inwards movement E of the latching elements 7.

By pressing on the actuating surface 9*a'*, as indicated by arrow P, the actuating element 9', the sleeve 27, on which the actuating element 9' acts, and the blocking element 26 which abuts against the sleeve 27 are displaced against the pressure force of the spring element 33 along the displacement axis 13. The elements 9', 27 and 26 are thereby moved to the configuration shown in FIG. 34. After relieving the surface 9*a'*, in other words after removing the finger after pressing with it on this surface, the blocking configuration shown in FIG. 35 is assumed under the effect of the spring elements 32, 33. In FIG. 35, the blocking element 26 is arranged in a second displacement position along the axis 13, in which the flanks 26*a* are located in each case at the height of the protrusion 25 of the adjacent latching element 7. Therefore, the blocking element 26 is arranged substantially between the protrusions 25. It is therefore not possible to press in the latching elements 7 in direction E, or this is possible only by a small path, wherein this path is not sufficient to allow the latching element 7 to engage behind the edge or the undercut 8 or to release such a latching engagement. In FIG. 35, the actuating element 9' is pushed further into the guide portion 31 than in FIG. 33, whereby the above-described flush alignment of the surface 9*a'* with the adjacent or surrounding outer surface is achieved and the signal surface 9*b'* is concealed.

The two positions of the blocking element 26 shown in FIGS. 33 and 35 are therefore two rest positions thereof which can be alternately assumed by manually pressing them-somewhat similar to actuating a push-button ball point pen—and which are retained without further actuation. This is achieved by means of the interaction of the sleeve 27 with the actuating element 9' and the guide portion 31 as described hereinafter, wherein reference is also made in particular to FIGS. 25-31.

At the beginning of the movement of the actuating element 9' in the direction of the arrow P, see FIG. 33, the sleeve 27 is guided in the interior of the guide portion 31 by guide ribs 34 extending along the outer side of the sleeve 27 and corresponding guide grooves 35*a* in the interior of the guide portion 31, and is prevented from rotating about the axis 13. The actuating element 9' has obliquely inclined active surfaces 36*a* which act on likewise obliquely inclined active surfaces 36*b* on an end face of the sleeve 27 facing away from the blocking element 26, whereby the sleeve 27 is likewise displaced in direction P during displacement of the blocking element 9'. In this case, the guide ribs 23 of the element 9' are guided in lower regions of the grooves 35*a* and further grooves 35*b*, FIG. 26.

Figure 34:
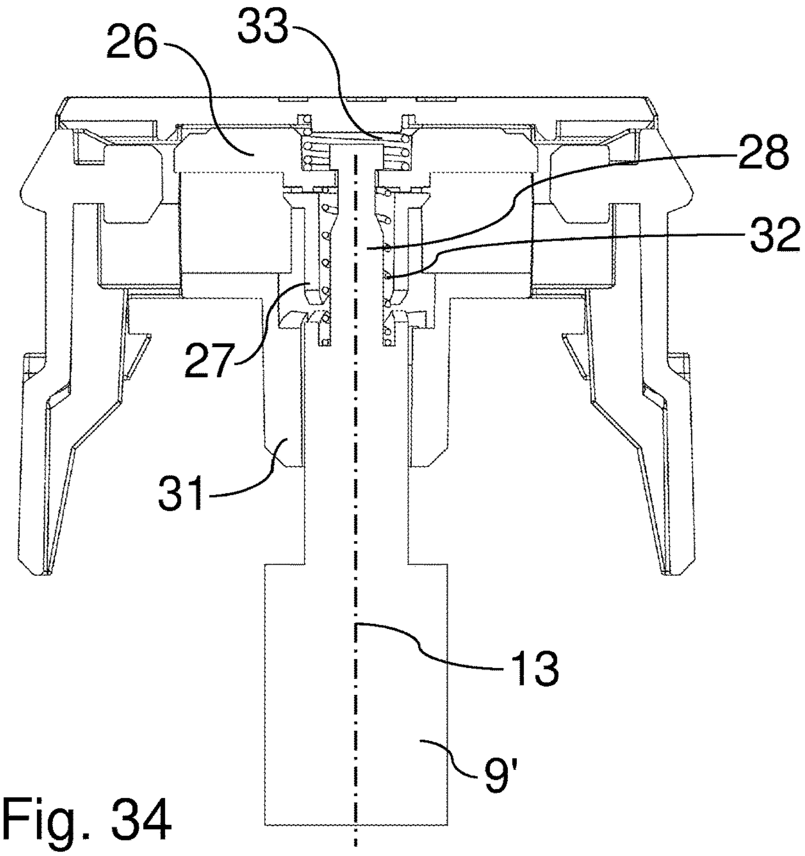
FIG. 34 shows the situation of FIG. 32 (*b*) in the mid-section of the assembled mounting arrangement.
Figure 35:
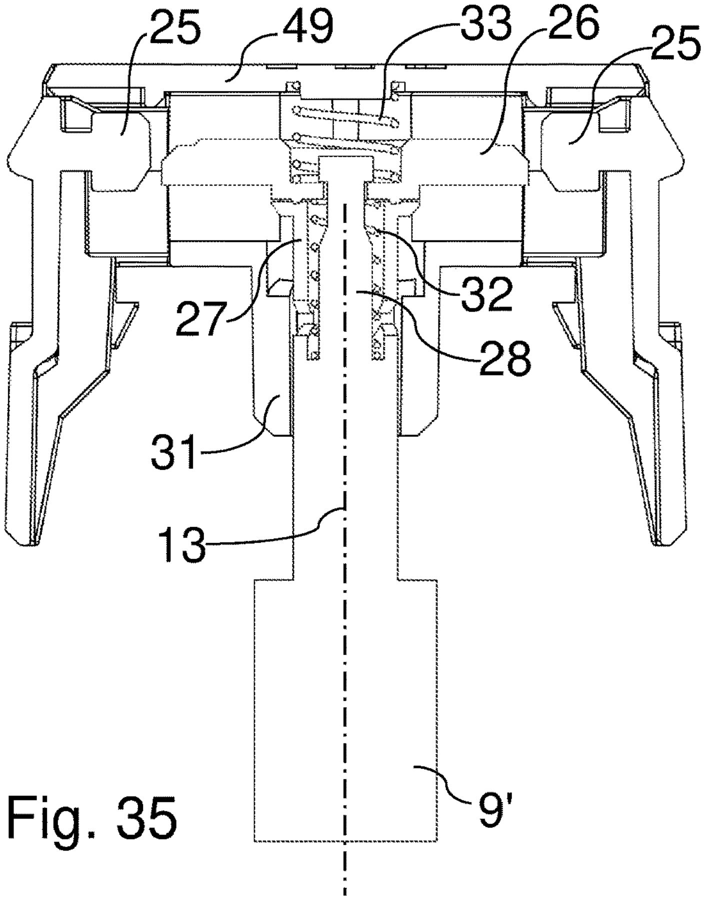
FIG. 35 shows the situation of FIG. 32 (*c*) in the mid-section of the assembled mounting arrangement.

After the element 9' has been pressed in sufficiently in direction P, see FIG. 34, the guide ribs 34 disengage from the guide grooves 35. The sleeve 27 can then be rotated about the displacement axis 13. A first partial rotation of the sleeve 27 is effected by the surfaces 36*a*, 36*b*, which can now slide a short distance onto one another by reason of the lack of engagement of the ribs and grooves 34, 35*a* as a result of the oblique position and under the effect of the counter-pressure built up by the spring element 33. As a result, the active surface 36*b* arrives at the guide portion 31 via an obliquely inclined active surface 37*a*, wherein the active surface 37*a* adjoins the groove 35*a*. When the actuating element 9' is released, i.e. the pressure on the surface 9*a'* is removed, the blocking element 26 moves in the direction opposite the direction of the arrow P under the effect of the spring force of the element 33, entrains the sleeve 27 in the same direction, whereby the active surface 36*b* slides over the active surface 37*a* and the sleeve 27, which can rotate relative to the blocking element 26, performs a further partial rotation about the axis 13 until it abuts with the rib 34 against a projecting wall 37*b* of a further guide groove 35*b*.

The parallel grooves 35*a* and 35*b* differ in that the groove 35*a* has a part which is recessed in the radial direction towards the sleeve 27 and in the direction towards the recess 22, whereas this is not the case with the groove 35*b*. A seat 38*b* is thus formed at the end of the groove 35*b* and is higher in the direction towards the recess 22 than a seat 38*a* formed in the groove 35*a*. The surface 36*b* is seated in sections on the seat 38*a* in the end-face region of the rib 34 if the sleeve 27 assumes a first position corresponding to the release configuration of the blocking arrangement 30'. In contrast, the surface 36*b* is seated in sections on the seat 38*a* if the sleeve 27 assumes a second position corresponding to the blocking configuration of the blocking arrangement 30'.

Figure 26:
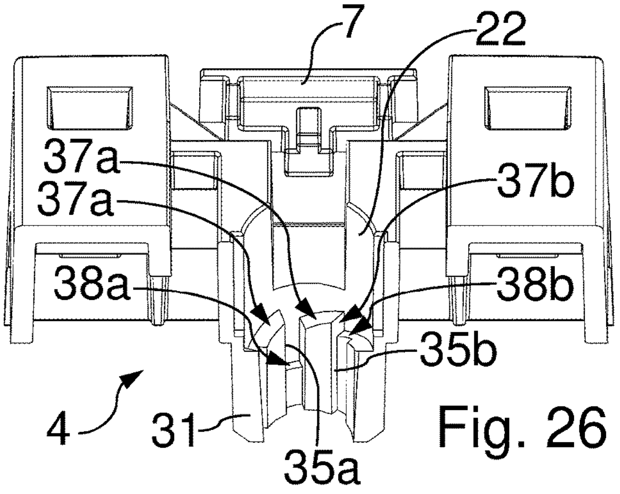
FIG. 26 shows a perspective mid-sectional view of a body of the mounting arrangement of FIG. 23.
Figure 24:
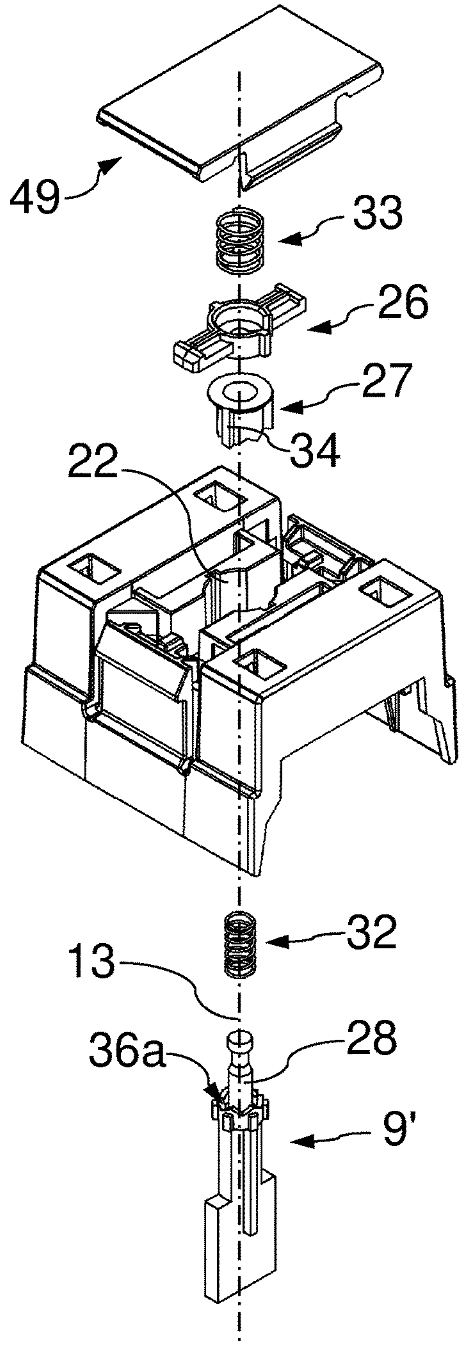
FIG. 24 shows an exploded view of the mounting arrangement of FIG. 23.
Figure 25:
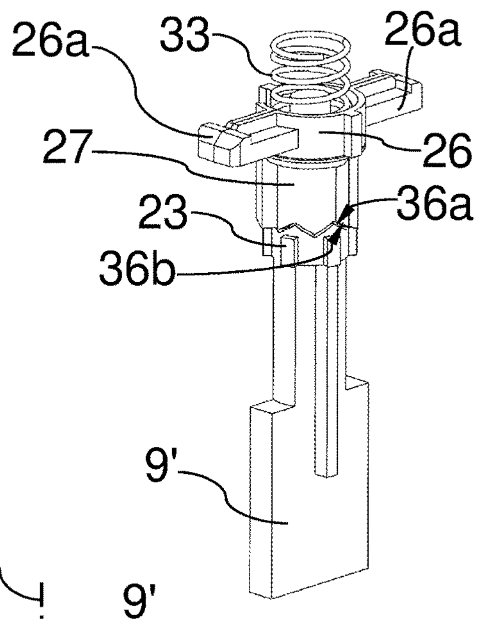
FIG. 25 shows some components of the mounting arrangement of FIG. 23 to illustrate the interaction thereof.
Figure 23:
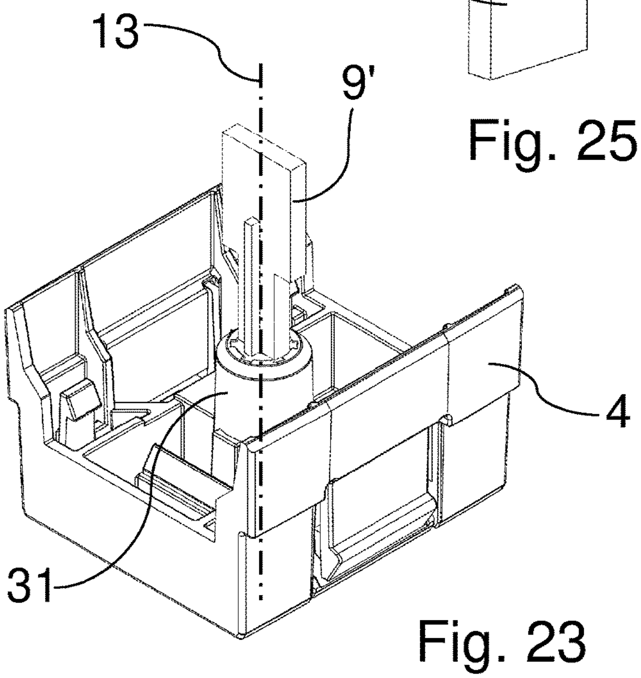
FIG. 23 shows one of the mounting arrangements provided in the second and third exemplified embodiments, as seen in a perspective view from an inner side of a body thereof.
Figure 27:
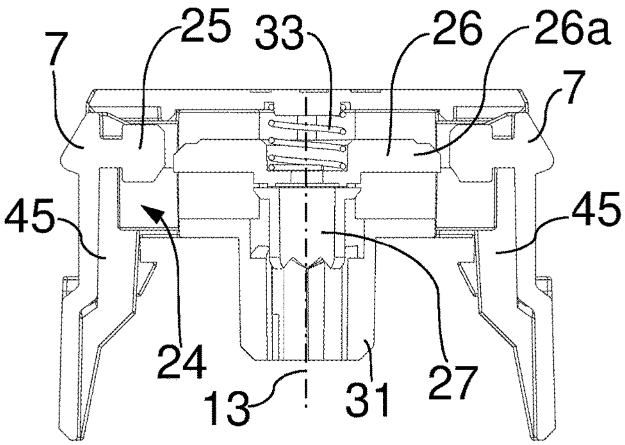
FIG. 27 shows some components of the mounting arrangement of FIG. 23 in the mid-section, for the blocking configuration of the blocking arrangement.
Figure 28:
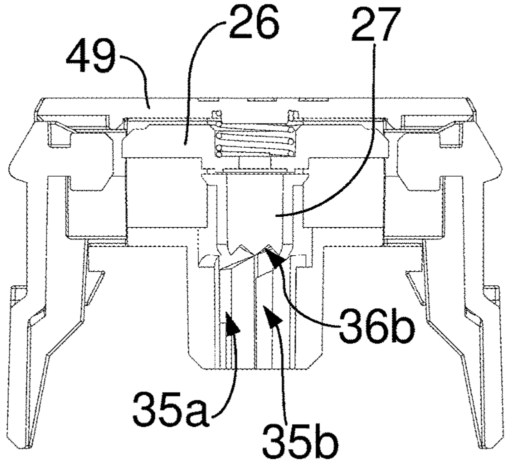
FIG. 28 shows the components of FIG. 27 during the transfer of the blocking arrangement from the blocking configuration to the release configuration at a first point in time.
Figure 29:
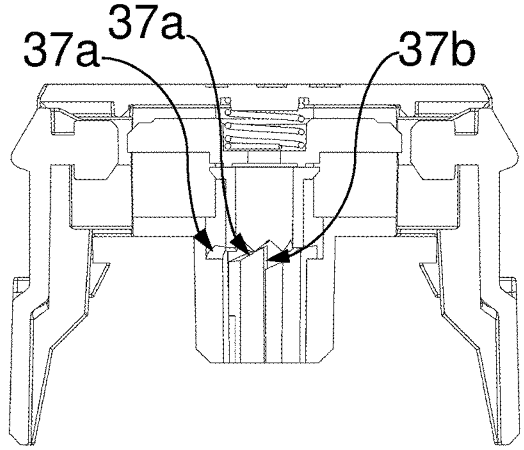
FIG. 29 shows the components of FIG. 27 at a later point in time than FIG. 28.
Figure 30:
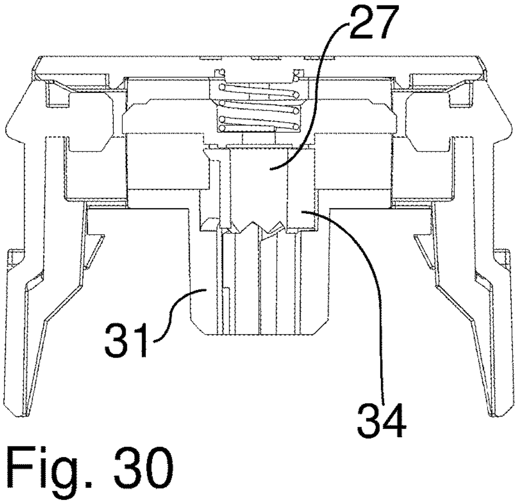
FIG. 30 shows the components of FIG. 27 at a later point in time than FIG. 29.
Figure 31:
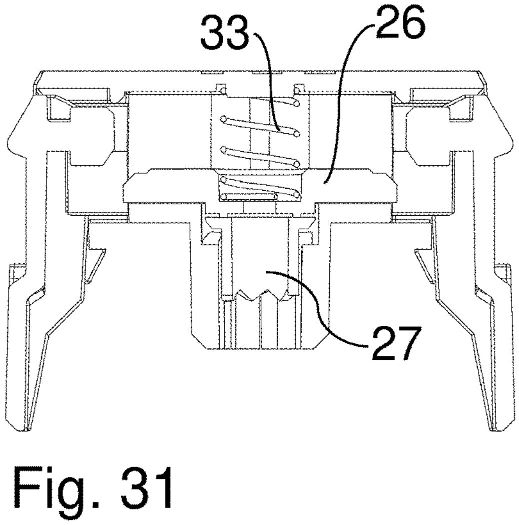
FIG. 31 shows the components of FIG. 27 at an even later point in time than FIG. 30, for the release configuration of the blocking arrangement.
Figure 32:
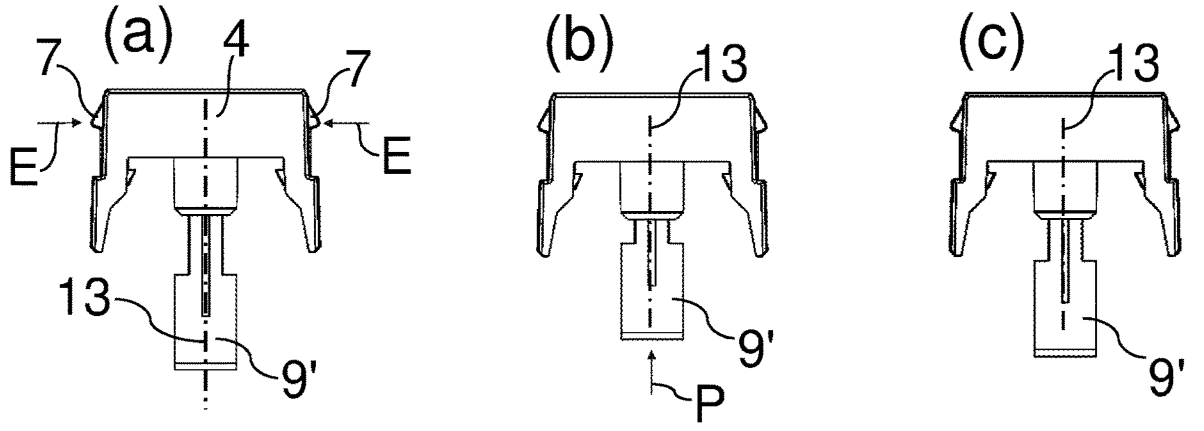
FIG. 32 shows an end-face view of the mounting arrangement of FIG. 23 for the release configuration in partial image (a), during actuation in order to achieve blocking in partial image (b) and in the blocking configuration of the blocking arrangement in partial image (c)

Pressing the actuating element 9' once again causes the rib 34 to become disengaged from the wall 37*b*, a first partial rotation of the sleeve 27 by reason of two surfaces 36*a* and 36*b* sliding onto one another under the effect of the spring element 33, and when the pressure is removed, causes the active surface 36*b* to come into contact with a further inclined surface 37*a* adjacent to the wall 37*b*, see FIG. 26 and, by reason of the surface 36*b* sliding thereon, a second partial rotation of the sleeve 27 until the guide rib 34 falls into the upper, recessed part of the guide groove 35*a* and back onto the seat 38*a*. Therefore, the sleeve 27 then assumes the first position corresponding to the release configuration.

The spring element 32 also ensures that the actuating element 9' always protrudes as far out of the guide portion 31 towards the visible side or light-emitting side as the position of the blocking element 26 allows, unless said actuating element is pressed. Therefore, a clear and reliable warning effect of the surface portion 9b' can be achieved.

The blocking arrangement 30 is actuated in the same way and functions in the same manner as set forth above for the blocking arrangement 30', with the exception that in the arrangement 30 the actuating element 9 is significantly shorter on the visible side, as it is to be covered by the inserted cover 50. The mounting arrangements 1, 1a and 1', 1a' are each formed with blocking arrangements 30 and 30' respectively, which are constructed and act in the same way. The bodies 4, 4a differ substantially in that the body 4a is longer in order to receive the contacting device 62. With regard to the latching and blocking mechanism, the bodies 4, 4a have the same design.

Provision can be made that in the state engaged by means of the latching elements 7, the light assembly 2, 2' and/or 2" can still be longitudinally displaced, at least to a certain extent, in the rail profile 3 in order to permit position corrections.

In the exemplified embodiments described above, the light assemblies 2, 2', 2" can thus be easily inserted on a building site by a fitter and at any point along an already installed/assembled track 3 and can then be removed just as easily and without tools. A plurality of insets 2, 2' can be lined up virtually seamlessly or with only a small distance or gap. For example, continuous light bands which are several meters in length can be produced. Modules formed with the light assemblies 2, 2', 2" can be used in individual profile lights or can be combined in different combinations in a profile light system.

A light assembly 2 or 2' can be e.g. up to about 3 meters long. However, other lengths are feasible.

In an advantageous manner, in the exemplified embodiments described above, the profile 3 can firstly be assembled separately and then the modules formed with the light assemblies 2, 2' and/or 2" can be inserted. During insertion, the light assemblies 2, 2', 2" in each case automatically hold onto the profile 3 in advance. For complete fixing, the actuating elements 9, 9' are pressed in, in order to block the latching devices 17. The signal surfaces 9b, 9b' advantageously help to ensure that this pressing-in is not forgotten. Light assemblies 2 can then be covered with the light-transmissive cover 50. During disassembly, all actuating elements 9 or 9' can initially be pressed in order to release the latching devices 17. In the meantime, the light assemblies 2, 2', 2" are still held on the rail profile 3 and are removed by pulling. Cumbersome cabling is avoided and assembly and disassembly are simplified considerably.

While the rail profile 3 and the assemblies 2, 2', 2" of the exemplified embodiments described above by way of example are each designed in a linear manner, in variants of the exemplified embodiments the profile 3 and the assemblies 2, 2', 2" could have a curved shape, in particular a planar curved shape. In this case too, the mounting arrangements 1, 1a, 1', 1a' facilitate assembly.

In variants of the above exemplified embodiments, the operating unit 70 or 70" could be installed together with the contacting device 62 and the mounting arrangement 1a or 1a' in one unit.

Although the present invention has been described in full above with the aid of preferred exemplified embodiments, it is not limited thereto but can be modified in diverse ways.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 02023110440.3, filed Apr. 24, 2023, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

LIST OF REFERENCE SIGNS

1, 1', 1" mounting assembly
2, 2', 2" light assembly
3 rail profile
3a, 3b side wall (rail profile)
4, 4a body
5, 5' rear-side region (light assembly)
6, 6' light-emitting side (light assembly)
7 latching element
7a inclined latching surface
7b inclined sliding ramp surface
8 edge or undercut
9, 9' actuating element
10 open longitudinal side (rail profile)
11 first side (body)
12 second side (body)
13 displacement axis
14 depth direction (rail profile)
15 transverse direction (rail profile)
16 longitudinal direction (rail profile)
17 latching device
18 carrier component
18r rear side (carrier component)
19 printed circuit board
20 LED device
21 passage opening
22 recess
23 guide ribs
24 inner side (latching element)
25 protrusion
26 blocking element
26a flank
26b passage opening
27 sleeve
28 coupling portion
30, 30' blocking arrangement
31 guide portion
31a end (guide portion)
32 spring element
33 spring element
34 guide ribs
35a, 35b guide grooves
36a, 36b active surfaces

37*a* active surfaces
37*b* wall
38*a*, 38*b* seat
40 pivot axis
44 inner region
45 limb
46 latching element
47 longitudinal edge (reflector)
48 contiguous region
49 cover element
50 cover
60 conductor device
61 conductor
62 contacting device
63 contact element
70, 70"operating unit
80 reflector arrangement
81' reflector portion
82' visible-side surface
85' opening
90" emitter
95' housing
95*a*" visible-side surface
96" opening
98' housing component
100 lighting apparatus
100' lighting apparatus
100" lighting apparatus
E inwards movement
P arrow

The invention claimed is:

1. A mounting arrangement for mounting a light assembly in an elongated rail profile (3) which is open on a longitudinal side (10), wherein the mounting arrangement has a latching device which is adapted to engage in a latching manner into the rail profile in order to hold the light assembly;

wherein the mounting arrangement has a blocking arrangement which can be moved to a release configuration in which the engagement of the latching device into the rail profile can be effected and released by overcoming an elastic force effect of the latching device, and can be moved to a blocking configuration in which the blocking arrangement prevents the engagement from being released against the elastic force effect; and wherein the blocking arrangement comprises an actuating element which can be actuated by an operator in a state in which the mounting arrangement holds the light assembly, which is inserted into the rail profile, therein, wherein the blocking arrangement can be moved to the release configuration and the blocking configuration in each case by means of actuation of the actuating element by pressing.

2. The mounting arrangement as claimed in claim 1, wherein the actuating element, for actuation thereof by the operator, can be displaced along a direction, which is substantially in parallel with a depth direction of the rail profile, by exerting a pressure force onto the actuating element.

3. The mounting arrangement as claimed in claim 1, wherein the actuating element can be actuated by the operator without tools.

4. The mounting arrangement as claimed in claim 1, wherein, during actuation, the actuating element can be displaced against an elastic force.

5. The mounting arrangement as claimed in claim 1, wherein the blocking arrangement can be transferred in an alternating manner to the release configuration and the blocking configuration by actuating the actuating element multiple times.

6. The mounting arrangement as claimed in claim 1, wherein the mounting arrangement has a body and that the latching device has latching elements which are arranged on the body and are adapted to engage in a latching manner in each case behind an edge extending along the rail profile, or behind an undercut of the rail profile extending along the rail profile.

7. The mounting arrangement as claimed in claim 6, wherein the latching elements can be pivoted in an elastic manner in each case about a pivot axis which extends substantially in parallel with a longitudinal direction of the rail profile.

8. The mounting arrangement as claimed in claim 6, wherein the latching elements are provided on opposite sides of the body, wherein by means of the latching elements on opposite sides of the rail profile, it is possible to engage behind edges or undercuts provided in the rail profile, and wherein, in the blocking configuration of the blocking arrangement, each of the latching elements is prevented from being released in each case from the edge or the undercut.

9. The mounting arrangement as claimed in claim 6, wherein the blocking arrangement has a displaceably guided blocking element, wherein the blocking element in the release configuration is located in a first displacement position, in which the latching elements for effecting or releasing the engagement into the rail profile can each be moved against the elastic force effect, and wherein the blocking element in the blocking configuration is located in a second displacement position, in which the blocking element prevents the movement of the latching elements for effecting or releasing the engagement into the rail profile in each case against the elastic force effect or limits a path of the movement of the latching elements.

10. The mounting arrangement as claimed in claim 9, wherein a protrusion is connected in each case to the latching elements and is provided on an inner side of the latching element facing an inner region of the body, wherein the protrusions provided on the inner side of the latching elements face one another, and the blocking element can be displaced such that the blocking element in the blocking configuration is arranged substantially between the protrusions.

11. The mounting arrangement as claimed in claim 9, wherein the actuating element and the blocking element are arranged so as to be displaceable along a common displacement axis and the blocking arrangement also has a sleeve which can be displaced along the displacement axis by actuation of the actuating element and can be rotated incrementally about the displacement axis, wherein the sleeve is arranged in the direction of the displacement axis in sections between surfaces of the actuating element and the blocking element which are provided for contact with the sleeve, and wherein the sleeve is supported in the release configuration in a first position along the displacement axis relative to the body and is supported in the blocking configuration in a second position, different from the first position, along the displacement axis relative to the body.

12. The mounting arrangement as claimed in claim 9, wherein the actuating element has a coupling portion which extends through an opening in the blocking element and engages in sections behind the blocking element.

13. The mounting arrangement as claimed in claim 1, wherein the actuating element has an end-face actuating surface and a circumferential surface portion adjacent to the actuating surface, wherein the circumferential surface portion is concealed in the blocking configuration.

14. The mounting arrangement as claimed in claim 13, wherein the circumferential surface portion is designed as a signal surface or having a warning colour.

15. The mounting arrangement as claimed in claim 1, wherein the mounting arrangement has a guide portion for the actuating element, the rail profile, in which the light assembly can be mounted by means of the mounting arrangement, can be closed, at least in regions, on the open longitudinal side by means of an insertable cover such that the cover conceals the guide portion on the visible side, and the actuating element in the release configuration protrudes from the guide portion or the actuating element in the blocking configuration is substantially flush with an end of the guide portion facing the cover.

16. The mounting arrangement as claimed in claim 1, wherein the actuating element in the release configuration protrudes on the outer side from a visible side of a housing or a reflector portion or a reflector arrangement of the light assembly or wherein that the actuating element in the blocking configuration is substantially flush with a visible-side housing surface or a visible-side surface of a reflector arrangement of the light assembly.

17. The mounting arrangement as claimed in claim 1, wherein the mounting arrangement can be mechanically coupled to a housing component or a profile-shaped carrier component and/or reflector component or a printed circuit board of the light assembly provided with LED devices.

18. The mounting arrangement as claimed in claim 1, wherein the body of the mounting arrangement has a U-shaped cross-section at least in sections, wherein a portion of the light assembly can be received in an inner region of the U-shape.

19. A lighting apparatus comprising an elongated rail profile, which is open on a longitudinal side, a light assembly and at least one mounting arrangement as claimed in claim 1, wherein the light assembly is inserted into the rail profile and the latching device of the mounting arrangement engages in a latching manner into the rail profile in order to hold the light assembly.

20. A lighting apparatus as claimed in claim 19, wherein the rail profile can be closed or is closed on the open longitudinal side by means of an insertable cover.

21. The lighting apparatus as claimed in claim 19, wherein a housing or a reflector portion or a reflector arrangement of the light assembly is provided on a visible side with an opening, wherein the actuating element in the release configuration protrudes on the outer side through the opening.

22. The lighting apparatus as claimed in claim 19, wherein a conductor device for providing an electrical supply voltage or and/or control signals is arranged on the rail profile, the light assembly is connected to two or more mounting arrangements to form a module, and the module is held in the rail profile by means of the mounting arrangements, wherein at least one of the mounting arrangements is designed together with a contacting device as one unit and conductors of the conductor device are contacted by means of the contacting device.

* * * * *